(12) United States Patent
Yu et al.

(10) Patent No.: US 12,197,050 B2
(45) Date of Patent: Jan. 14, 2025

(54) INTEGRATED III-V / SILICON OPTOELECTRONIC DEVICE AND METHOD OF MANUFACTURE THEREOF

(71) Applicant: ROCKLEY PHOTONICS LIMITED, Altrincham (GB)

(72) Inventors: Guomin Yu, Glendora, CA (US); Aaron John Zilkie, Pasadena, CA (US); Frank Peters, Cork (IE)

(73) Assignee: Rockley Photonics Limited, Altrincham (GB)

( * ) Notice: Subject to any disclaimer, the term of this patent is extended or adjusted under 35 U.S.C. 154(b) by 1068 days.

(21) Appl. No.: 17/104,670

(22) Filed: Nov. 25, 2020

(65) Prior Publication Data
US 2021/0181546 A1  Jun. 17, 2021

(30) Foreign Application Priority Data
Nov. 26, 2019 (GB) .................................. 1917209

(51) Int. Cl.
*G02F 1/025* (2006.01)
*G02F 1/01* (2006.01)

(52) U.S. Cl.
CPC ............ *G02F 1/0147* (2013.01); *G02F 1/025* (2013.01)

(58) Field of Classification Search
CPC ................... G02F 1/0147; G02F 1/025; G02B 2006/12142; G02B 6/12004
(Continued)

(56) References Cited

U.S. PATENT DOCUMENTS 5,780,875 A * 7/1998 Tsuji .................... G02B 6/4249
385/83
5,870,417 A    2/1999 Verdiell et al.
(Continued)

FOREIGN PATENT DOCUMENTS

EP    2 829 906 A1    1/2015
EP    3 296 805 A1    3/2018
(Continued)

OTHER PUBLICATIONS

"Low loss GaInNAs/GaAs gain waveguides with U-bend geometry for single-facet coupling in hybrid photonic integration" by Tuorila et al, Applied Physics Letters, vol. 113, paper 041104, (Year: 2018).*
(Continued)

*Primary Examiner* — Robert Tavlykaev
(74) *Attorney, Agent, or Firm* — Lewis Roca Rothgerber Christie LLP

(57) ABSTRACT

An optoelectronic device. The optoelectronic device comprising: a silicon-on-insulator platform, including: a silicon waveguide located within a silicon device layer of the platform, a substrate, and an insulator layer between the substrate and the silicon device layer; and a III-V semiconductor based device, located within a cavity of the silicon-on-insulator platform and including a III-V semiconductor based waveguide, coupled to the silicon waveguide; wherein the III-V semiconductor based device includes a heater and one or more electrical traces, connected to the heater, wherein the one or more electrical traces extend from the III-V semiconductor based device to respective contact pads on the silicon-on-insulator platform.

20 Claims, 22 Drawing Sheets

(58) Field of Classification Search
USPC .................................................. 385/1–3, 14
See application file for complete search history.

(56) References Cited

U.S. PATENT DOCUMENTS

| | | | |
|---|---|---|---|
| 6,700,910 | B1 | 3/2004 | Aoki et al. |
| 11,307,440 | B2* | 4/2022 | Krasulick ............... G02F 1/017 |
| 2006/0093002 | A1* | 5/2006 | Park ...................... H01S 5/0236 |
| | | | 372/50.1 |
| 2010/0111461 | A1* | 5/2010 | Takahashi ............. G02F 1/0147 |
| | | | 385/1 |
| 2012/0087613 | A1* | 4/2012 | Rasras .................. G02F 1/2257 |
| | | | 257/E31.124 |
| 2014/0319656 | A1* | 10/2014 | Marchena ........... H01S 5/02326 |
| | | | 438/106 |
| 2015/0092799 | A1 | 4/2015 | Hasegawa et al. |
| 2015/0098676 | A1* | 4/2015 | Krasulick .......... G02B 6/12004 |
| | | | 438/27 |
| 2017/0155452 | A1* | 6/2017 | Nagra ..................... G02F 1/025 |
| 2018/0026426 | A1 | 1/2018 | Kawakita et al. |
| 2018/0052290 | A1* | 2/2018 | Kinghorn ................ H01L 25/50 |
| 2018/0067343 | A1* | 3/2018 | Krasulick ........... G02F 1/01708 |
| 2019/0243081 | A1* | 8/2019 | Watts ...................... G02F 1/011 |
| 2020/0209655 | A1* | 7/2020 | Roth .................... G02F 1/01708 |
| 2020/0278506 | A1* | 9/2020 | Aalto ..................... G02B 6/423 |

FOREIGN PATENT DOCUMENTS

| | | |
|---|---|---|
| EP | 3 506 000 A1 | 7/2019 |
| EP | 3 674 780 A1 | 7/2020 |

OTHER PUBLICATIONS

"Integration of III-V light sources on a silicon photonics circuit by transfer printing" by Juvert et al., IEEE 14th International Conference on Group IV Photonics, pp. 171-172 (Year: 2017).*

"100Gb/s CWDM Transmitter and Receiver Chips on a Monolithic Si-Photonics Platform" by Li et al, IEEE 13th International Conference on Group IV Photonics, pp. 164-165 (Year: 2016).*

Deng, H. et al., "Wavelength Tunable V-Cavity Laser Employing Integrated Thin-Film Heaters", IEEE Photonics Journal, Aug. 1, 2016, 9 pages, vol. 8, No. 4, IEEE.

Invitation to Pay Additional Fees and Partial International Search Report of the International Searching Authority, Mailed Feb. 23, 2021, Corresponding to PCT/EP2020/083242, 15 pages.

Juvert, J. et al., "Integration of III-V light sources on a silicon photonics circuit by transfer printing", 2017 IEEE 14$^{th}$ International Conference on Group IV Photonics, Aug. 23, 2017, pp. 171-172, IEEE.

Liu Liu, T. S. et al., "A Thermally Tunable Microdisk Laser Built on a III-V/Silicon-on-Insulator Heterogeneous Integration Platform", pp. 1-3.

Mei, S. et al., "Thermal conductivity of III-V semiconductor superlattices", Journal of Applied Physics, Nov. 7, 2015, pp. 175101-1 through 175101-8, vol. 118, No. 17, American Institute of Physics Publishing LLC.

U.K. Intellectual Property Office Search and Examination Report, Dated May 19, 2020, for Patent Application No. GB1917209.7, 11 pages.

International Search Report and Written Opinion of the International Searching Authority, Mailed Apr. 22, 2021, Corresponding to PCT/EP2020/083242, 21 pages.

U.K. Intellectual Property Office Examination Report, dated Feb. 22, 2022, for Patent Application No. GB1917209.7, 5 pages.

Chinese Notification of the First Office Action, for Patent Application No. 202022762237.7, mailed Jun. 8, 2021, 2 pages.

Partial English translation of the Chinese Notification of the First Office Action, for Patent Application No. 202022762237.7, mailed Jun. 8, 2021, 1 page.

* cited by examiner

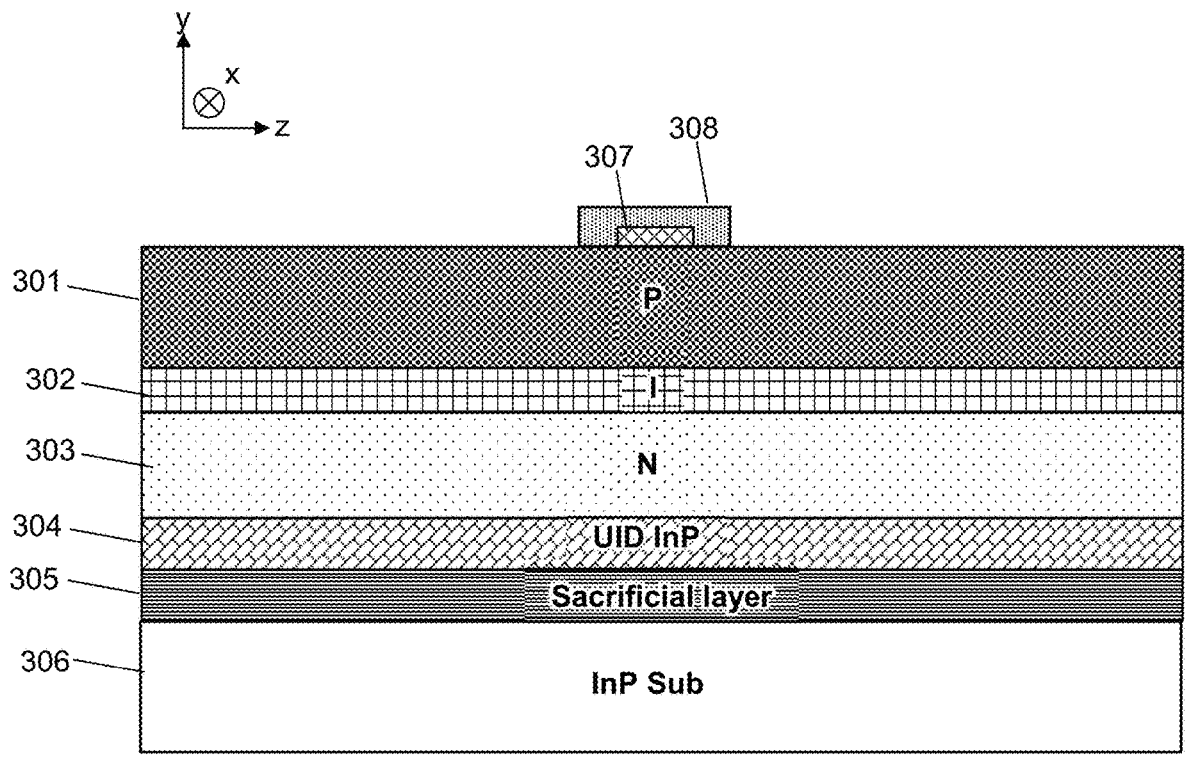
Figure 3(iii)

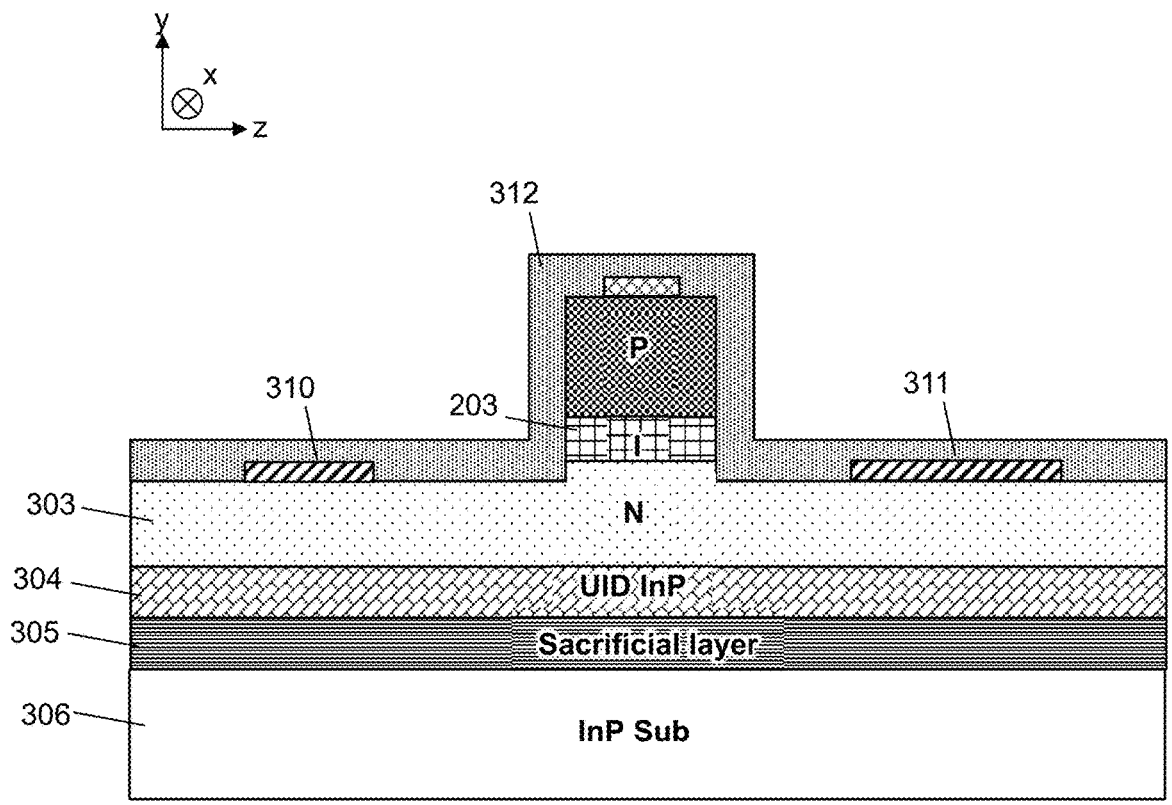
Figure 3(vii)
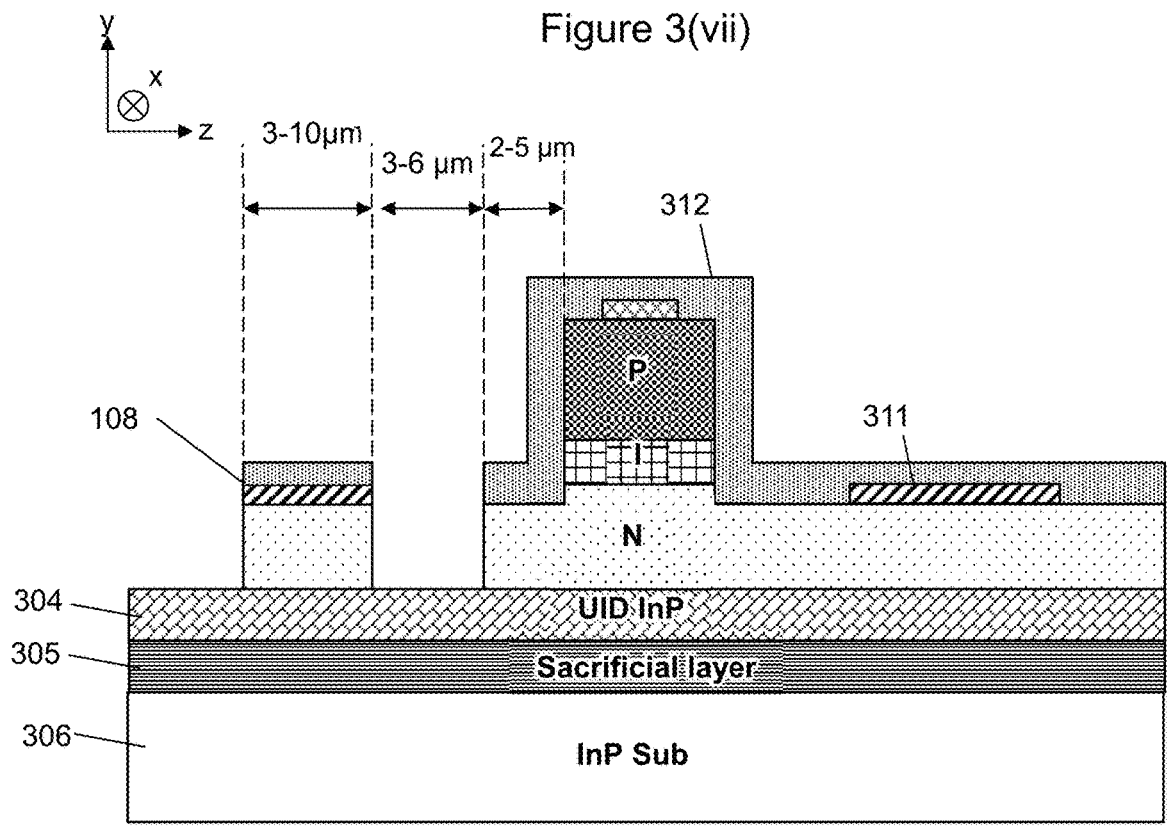
Figure 3(viii)

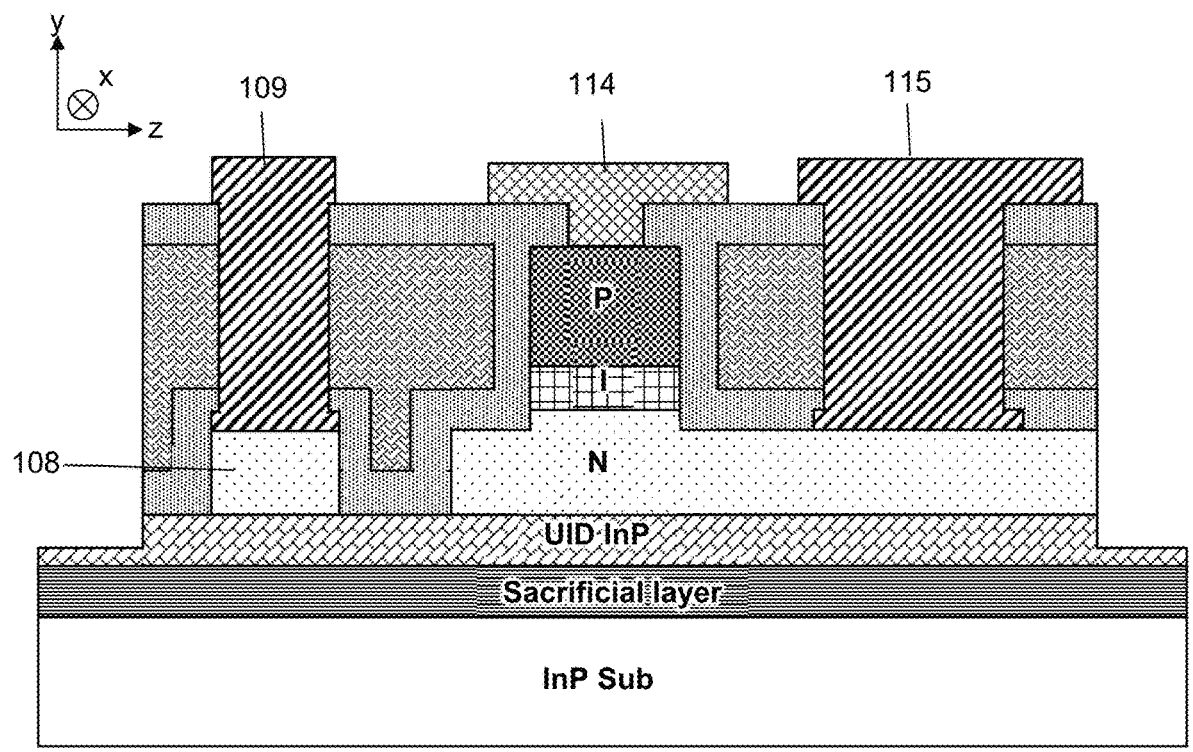
Figure 3(xii)

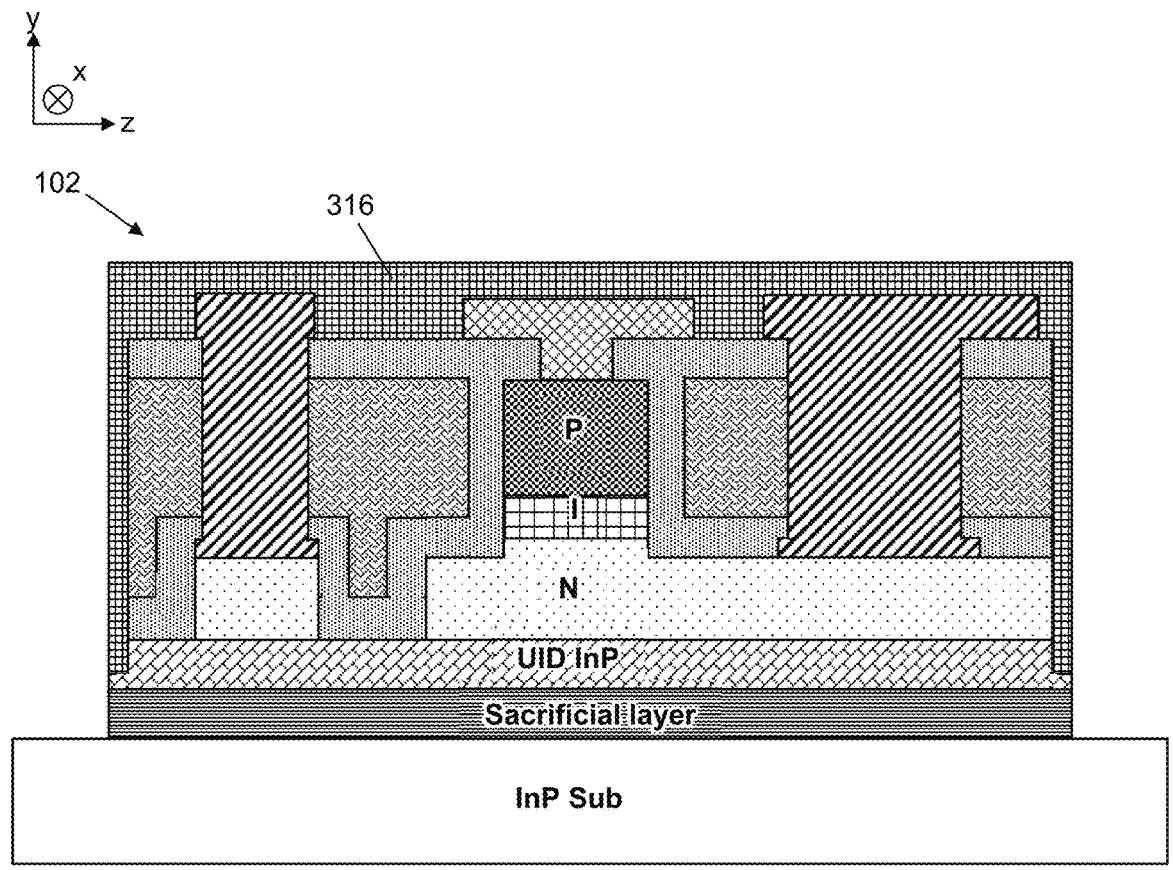
Figure 3(xiii)
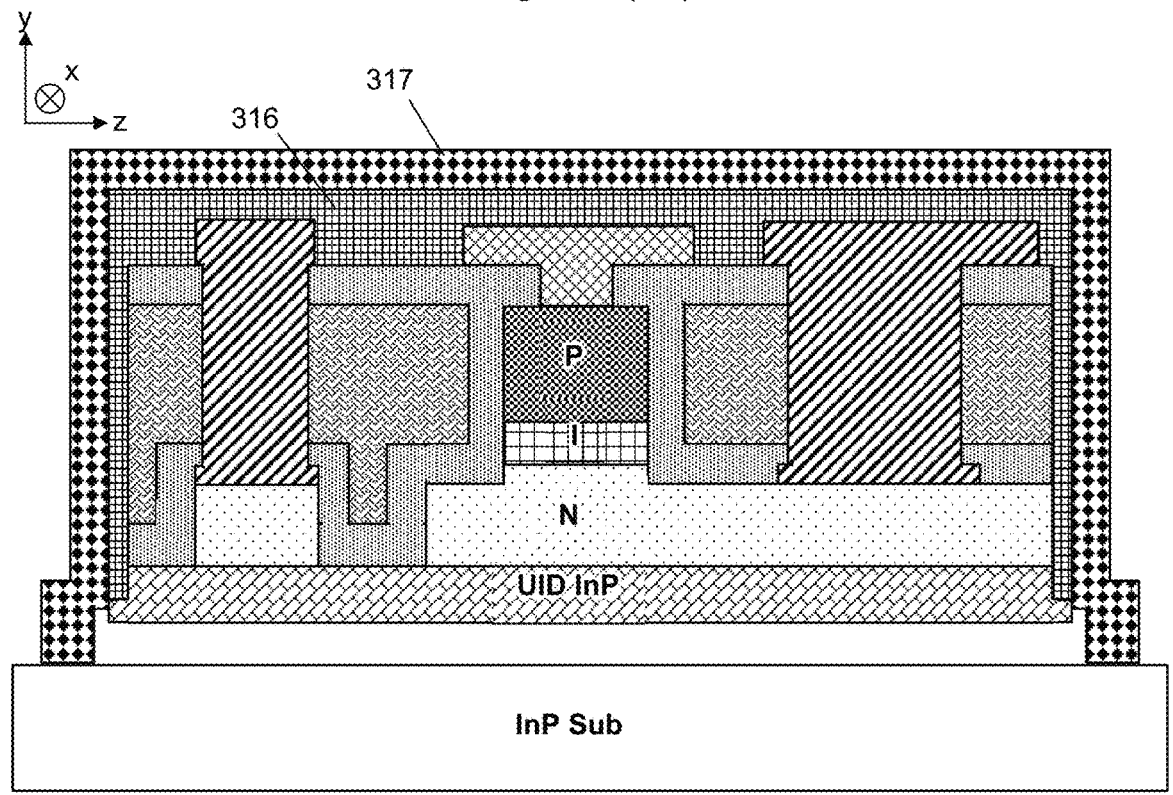
Figure 3(xiv)

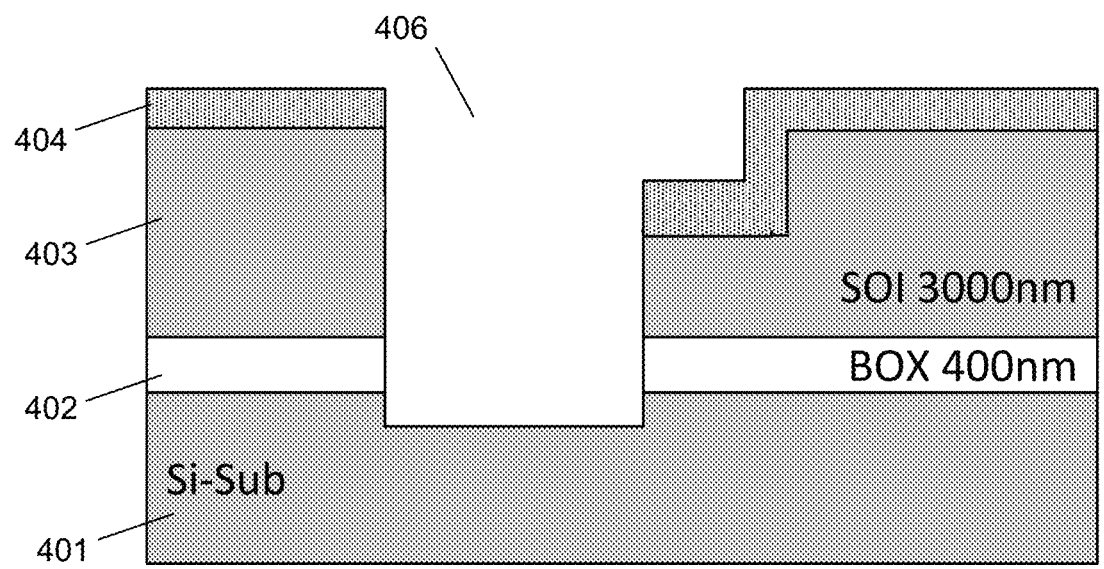
Figure 4(iii)

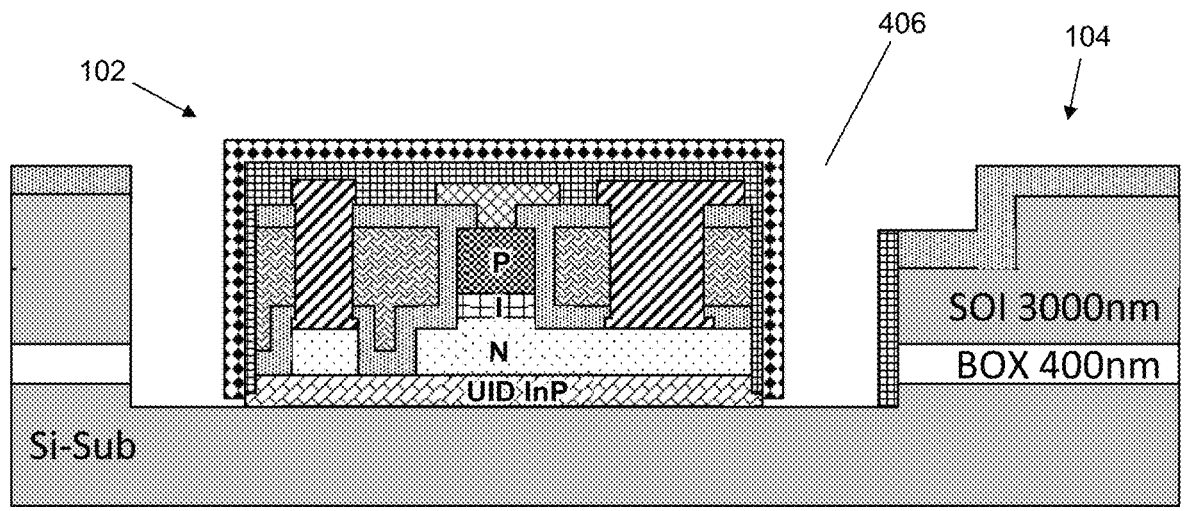
Figure 5(iii)

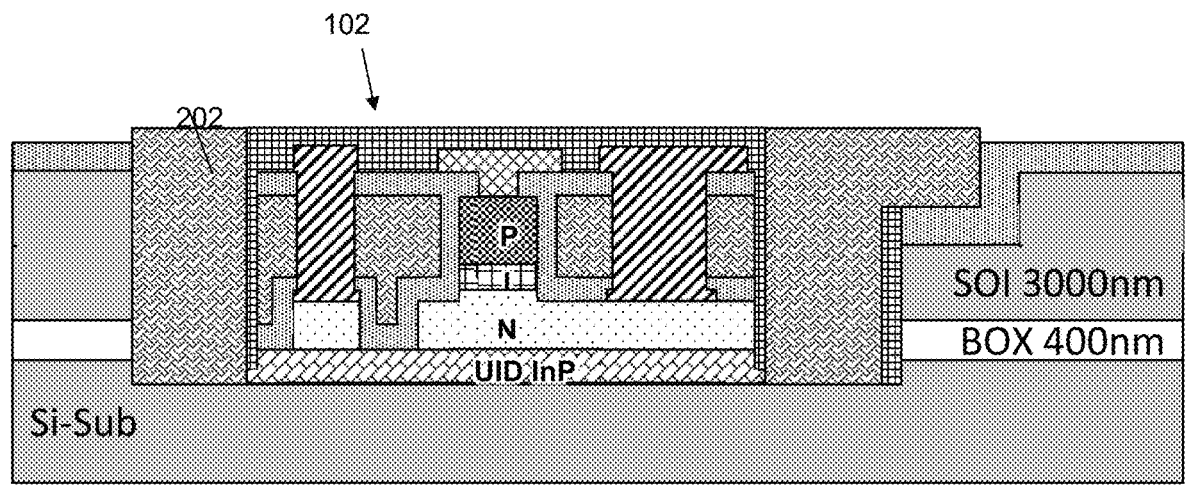
Figure 5(vii)
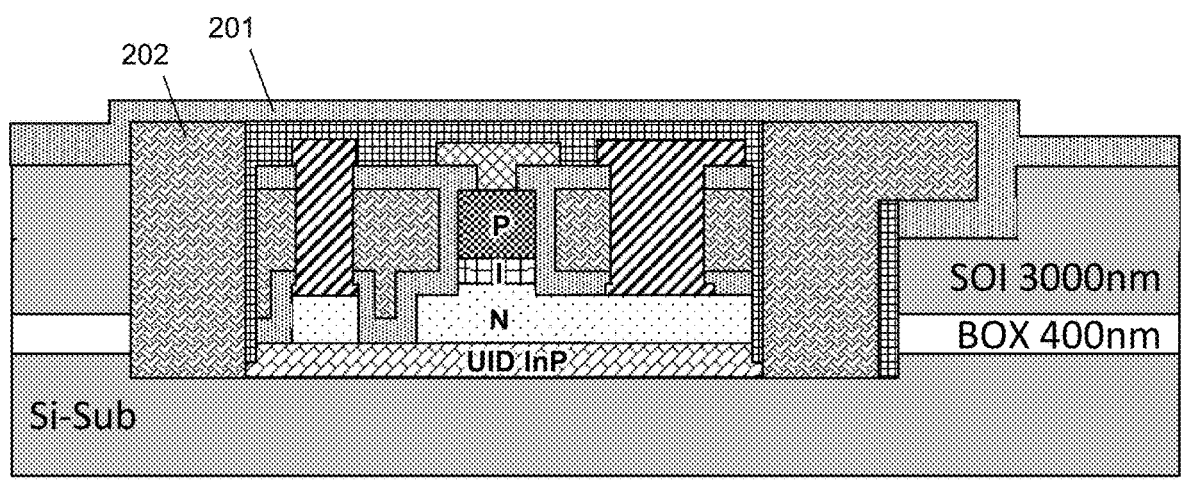
Figure 5(viii)

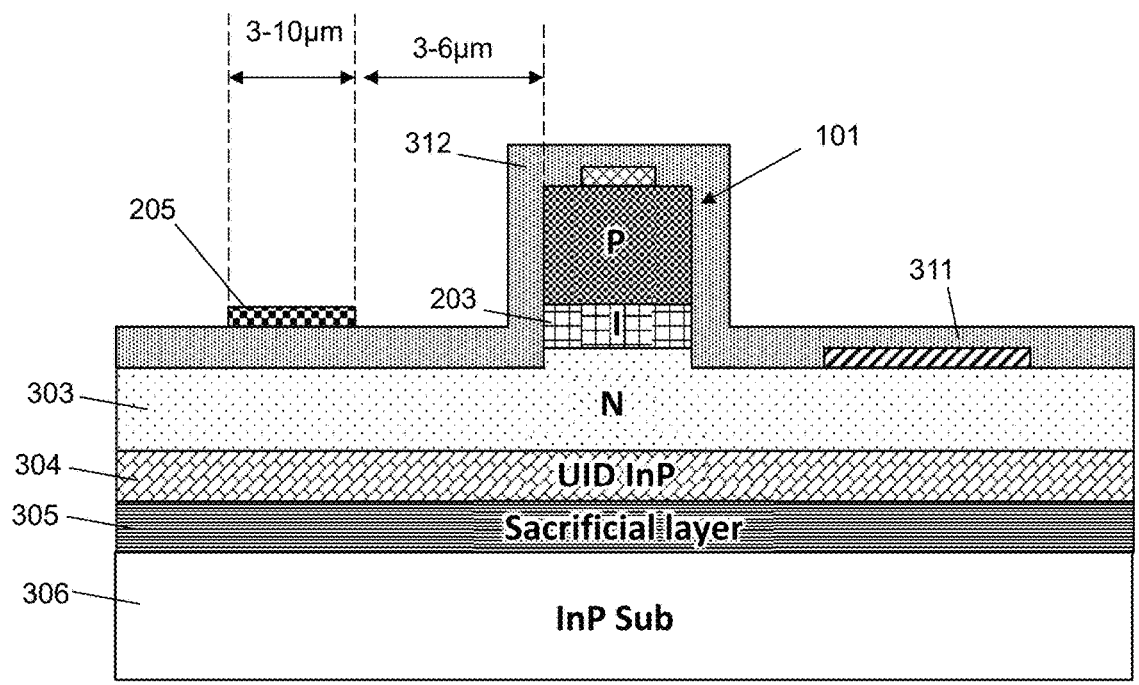
Figure 6(iii)

INTEGRATED III-V / SILICON OPTOELECTRONIC DEVICE AND METHOD OF MANUFACTURE THEREOF

CROSS-REFERENCE TO RELATED APPLICATION

This application claims priority to, and the benefit of, United Kingdom Patent Application No. GB 1917209.7, filed on Nov. 26, 2019, in the United Kingdom Intellectual Property Office, the disclosure of which is incorporated by reference herein in its entirety.

FIELD OF THE INVENTION

The present invention relates to an integrated III-V/Silicon optoelectronic device and a method of manufacturing the same.

BACKGROUND

Hybrid integration of III-V semiconductor based electro-optical devices (e.g. modulators), with silicon-on-insulator (SOI) platforms confers the advantage of combining the best parts of both material systems.

However, conventional chip bonding processes typically use flip-chip bonding, in which the III-V semiconductor based device is inverted and bonded into a cavity on the SOI platform. Devices fabricated using these methods typically suffer from high optical coupling losses between a waveguide in the III-V semiconductor based device and a waveguide in the SOI. Further, the manufacturing process has a relatively low yield, and relatively low reliability due to difficulties in accurately controlling the alignment of the respective waveguides.

Micro-transfer printing (MTP) is therefore being looked into as an alternative way to integrate III-V semiconductor based devices with SOI wafers. In these methods, the III-V semiconductor based device, in the form of a device coupon, can be printed into a cavity on the SOI in the same orientation it was manufactured, and the alignment between the III-V semiconductor based waveguide and the SOI waveguide is predetermined in the vertical direction (Z-direction). The requirements for alignment are therefore reduced from three dimension to two, which can be more easily facilitated.

For III-V semiconductors, it is known that their bandgap varies with temperature. As the temperature increases, the bandgap typically becomes smaller and therefore the corresponding operating wavelength becomes longer (red shifting). By changing the operating temperature, a III-V semiconductor based electro-absorption modulator's (EAM) operating wavelength can be adjusted. For example, for coarse-wavelength division modulator (CWDM) applications, the same EAM can be operated at a plurality of wavelengths (e.g. 4 or more) by adjusting the operating temperature.

However, there are a number of issues with the provision of a heater in a III-V semiconductor based EAM. Firstly, where MTP processes are used, the real estate in the III-V semiconductor device coupon is at a premium and so the accommodation of contact pads for the heater can be at the detriment of device performance. Secondly a heater can negatively affect the speed and/or bandwidth at which the EAM operates, for example by interfering with the electrodes for the EAM. Finally, the fabrication process of a heater is often at odds with the fabrication processes for the III-V semiconductor device coupon.

The invention aims to address the above issues.

SUMMARY

Accordingly, in a first aspect, embodiments of the present invention provide an optoelectronic device, comprising:
 a silicon-on-insulator platform, including:
  a silicon waveguide located within a silicon device layer of the platform, a substrate, and an insulator layer between the substrate and the silicon device layer; and
 a III-V semiconductor based device, located within a cavity of the silicon-on-insulator platform and including a III-V semiconductor based waveguide, coupled to the silicon waveguide;
 wherein the III-V semiconductor based device includes a heater and one or more electrical traces, connected to the heater, wherein the one or more electrical traces extend from the III-V semiconductor based device to respective contact pads on the silicon-on-insulator platform.

Such an optoelectronic device benefits from the inclusion of a heater, whilst not suffering from the drawbacks discussed above. Specifically, the provision of contact pads for the heater on the silicon-on-insulator platform ensures that the speed and/or bandwidth of the III-V semiconductor based device is not affected by the heater. Further, real estate in the III-V semiconductor device is preserved.

The optoelectronic device may have any one, or any combination insofar as they are compatible, of the following optional features.

The one or more electrical traces connected to the heater may be laterally spaced from one or more traces electrically connected to one or more electro-optically active components in the III-V semiconductor based device. This can ensure that the traces for the heater do not interfere with the traces for the electro-optically active component(s).

The III-V semiconductor based device may be formed of any one or more of: InP; InGaAsP; AlInGaAs; and InGaNAs.

The III-V semiconductor based waveguide may be curved, and the heater may be located adjacent to the waveguide and with a corresponding curve. The heater may be located on an inside region of the curved III-V semiconductor based waveguide.

The heater may be a doped region of the III-V semiconductor based device. The doped region may be doped with an n-type or a p-type species of dopant.

The heater may be a metal region on or adjacent to the III-V semiconductor based device. The metal may be selected from a list comprising: titanium, titanium nitride, chromium, and nickel.

The silicon-on-insulator platform may include a thermal isolation cavity, located at least partially below the III-V semiconductor based device. Such a cavity can help thermally isolate the heater in the III-V semiconductor based device and so increase the efficiency of the heater.

A portion of the heater closest to an electro-optically active component of the III-V semiconductor base device may be at least 3 μm away from the electro-optically active component in the III-V semiconductor based device. This can help ensure uniform heating over a spatial region defining or including the electro-optically active component.

The III-V semiconductor based device may include an electro-absorption modulator, EAM. The EAM may be formed of a p-doped region facing an n-doped region across an intrinsic region, thereby forming a p-i-n junction. The application of a voltage to the p-doped and n-doped regions causes an electric field to be generated across the p-i-n junction. The absorption profile of the junction to light passing therethrough varies as a function of the applied electric field. The index of refraction may also change as a function of the applied electric field.

In a second aspect, embodiments of the invention provide a method of manufacturing an optoelectronic device, comprising the steps of:
  providing a silicon-on-insulator platform, the platform including:
    a silicon waveguide located within a device layer, a substrate, an insulator layer between the substrate and the silicon device layer, and a cavity;
  providing a III-V semiconductor based device coupon, including a III-V semiconductor based waveguide and a heater;
  transfer printing the III-V semiconductor based device coupon into the cavity of the silicon-on-insulator platform; and
  electrically connecting the heater, via one or more traces, to one or more contact pads provided in the silicon-on-insulator platform.

Such a manufacturing method avoids any conflict between the heater fabrication process and the III-V semiconductor based waveguide fabrication process.

The method may include a step, before electrically connecting the heater, of spin coating a dielectric material into one or more channels between the device coupon and one or more sidewalls of the cavity of the silicon-on-insulator platform. The method may include a step, after spin coating the dielectric material, of thermally curing the dielectric material.

The method may include a step, after transfer printing the III-V semiconductor based device coupon, of depositing a passivation layer over an exposed upper surface of the III-V semiconductor based device coupon. The passivation layer increases the longevity and reliability of the device. The method may include a step, after depositing the passivation layer, of opening a contact window above the heater, before electrically connecting the heater via the one or more traces to the one or more contact pads.

The method may include a step, before transfer printing the III-V semiconductor based device coupon, of etching a thermally isolating cavity into a bed of the cavity in the silicon-on-insulator platform.

In a third aspect, embodiments of the present invention provide a method of manufacturing a III-V semiconductor based device coupon, the method comprising the steps of:
  providing a multi-layered stack of III-V semiconductor layers;
  fabricating one or more III-V semiconductor based optically active components from the multi-layered stack;
  fabricating a heater, in or on one of the III-V semiconductor layers; and
  providing one or more electrical traces from the heater to an uppermost surface of the III-V semiconductor based device coupon.

The method may include a step of providing an antireflective coating around one or more lateral sides of the device coupon. This antireflective coating can function to both: (i) reduce the optical losses of light entering a waveguide in the III-V semiconductor based device coupon; and (ii) help protect the lateral sides of the device coupon.

In a fourth aspect, embodiments of the present invention provide a method of preparing a silicon-on-insulator platform for a transfer printing process, the silicon-on-insulator platform including a device cavity in which a III-V semiconductor based device coupon including a heater can be deposited, the method comprising the step of: etching one or more thermally isolating cavities into a bed of the device cavity.

In a fifth aspect, embodiments of the present invention provide a III-V semiconductor based device coupon suitable for transfer printing onto a silicon-on-insulator platform, the device coupon comprising:
  a III-V semiconductor based waveguide; and
  a heater.

The device coupon of the fifth aspect may have any one, or any combination insofar as they are compatible, of the optional features set out with reference to the other aspects of the invention.

The device coupon may not contain any electrical contacts suitable for wire bonding to the heater, but may instead have one or more electrical pads for connecting to traces.

In a sixth aspect, embodiments of the present invention provide a silicon-on-insulator platform, for use in a transfer printing process, the silicon-on-insulator platform including:
  one or more silicon waveguides; and
  a cavity, including a sidewall to which the one or more silicon waveguides are optically coupled;
  wherein the cavity includes a thermal isolation cavity formed in a bed thereof.

The silicon-on-insulator platform of the sixth aspect may include any one, or any combination insofar as they are compatible, of the optional features set out with reference to the other aspects of the invention.

In a seventh aspect, embodiments of the present invention provide an optoelectronic device as manufactured according to the method of the second aspect.

In an eighth aspect, embodiments of the present invention provide a III-V semiconductor based device coupon as manufactured according to the method of the third aspect.

In a ninth aspect, embodiments of the present invention provide a silicon-on-insulator platform for a transfer printing process as prepared according to the method of the fourth aspect.

Further aspects of the present invention provide: a computer program comprising code which, when run on a computer, causes the computer to perform the method of the second, third, or fourth aspect; a computer readable medium storing a computer program comprising code which, when run on a computer, causes the computer to perform the method of the second, third, or fourth aspect; and a computer system programmed to perform the method of the second, third, or fourth aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
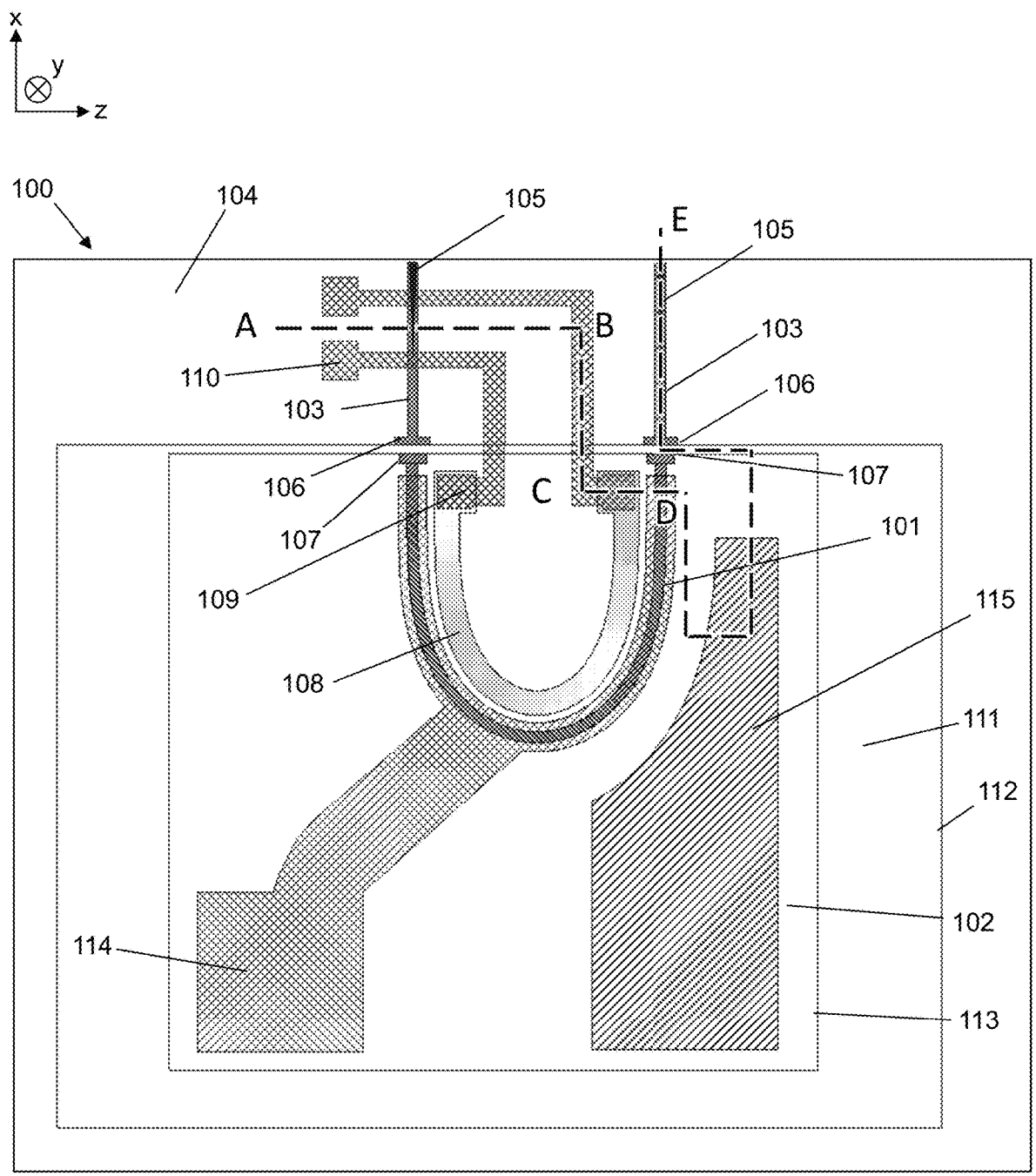
FIG. 1 shows a top-down schematic drawing of an optoelectronic device according to embodiments of the present invention.

FIG. 1 shows a top-down schematic drawing of an optoelectronic device 100 according to embodiments of the present invention. In the top-down view, various upper layers have been omitted for clarity (for example, upper passivation layers).

Broadly, the device 100 is formed of a III-V semiconductor based device coupon 102, located within a cavity 111 of a silicon-on-insulator platform 104 defined by cavity edge 112. The portion of the cavity not taken up by the device coupon 102, i.e. between device coupon edge 113 and cavity edge 112, is filled with a dielectric material. The device coupon includes a III-V semiconductor based waveguide, in this example in a 'U' shape such that an input and output portion of the waveguide abut a same sidewall of the cavity 111.

The silicon-on-insulator platform 104 includes two silicon waveguides 103, a rib of which tapers through respective taper regions 105 from a first width, adjacent to an edge of the platform 104, to a second width adjacent to the cavity 111. The first width being wider than the second width. Each silicon waveguide terminates, at an end closest to the cavity, in a facet 106. In this example the facets are 'T' bar facets. A corresponding facet 107 is located at each end of the 'U' shaped III-V semiconductor based waveguide 101.

As is discussed in more detail below, the III-V semiconductor based waveguide includes two electro-optically active layers: an n-doped layer and a p-doped layer. The n-doped layer is connected to n-electrode 115, and the p-doped layer is connected p-electrode 114, or vice versa.

The III-V device coupon 102 also includes a heater 108, which is proximal to the III-V semiconductor based waveguide 101. The heater 108 in this example has a curved shape, corresponding in curvature to the 'U' shaped waveguide 101. The heater is located on the inside of the curve of the 'U' shaped waveguide. Metal traces 110 extend from contact pads on the silicon-on-insulator platform, across to the III-V semiconductor based device coupon 102 so as to contact metal pads 109 for the heater 108. Notably, these electrodes are distal from the p-electrode 114 and n-electrode 115, and so do not interfere with the operation of the electro-optically active layers.

Figure 2A:
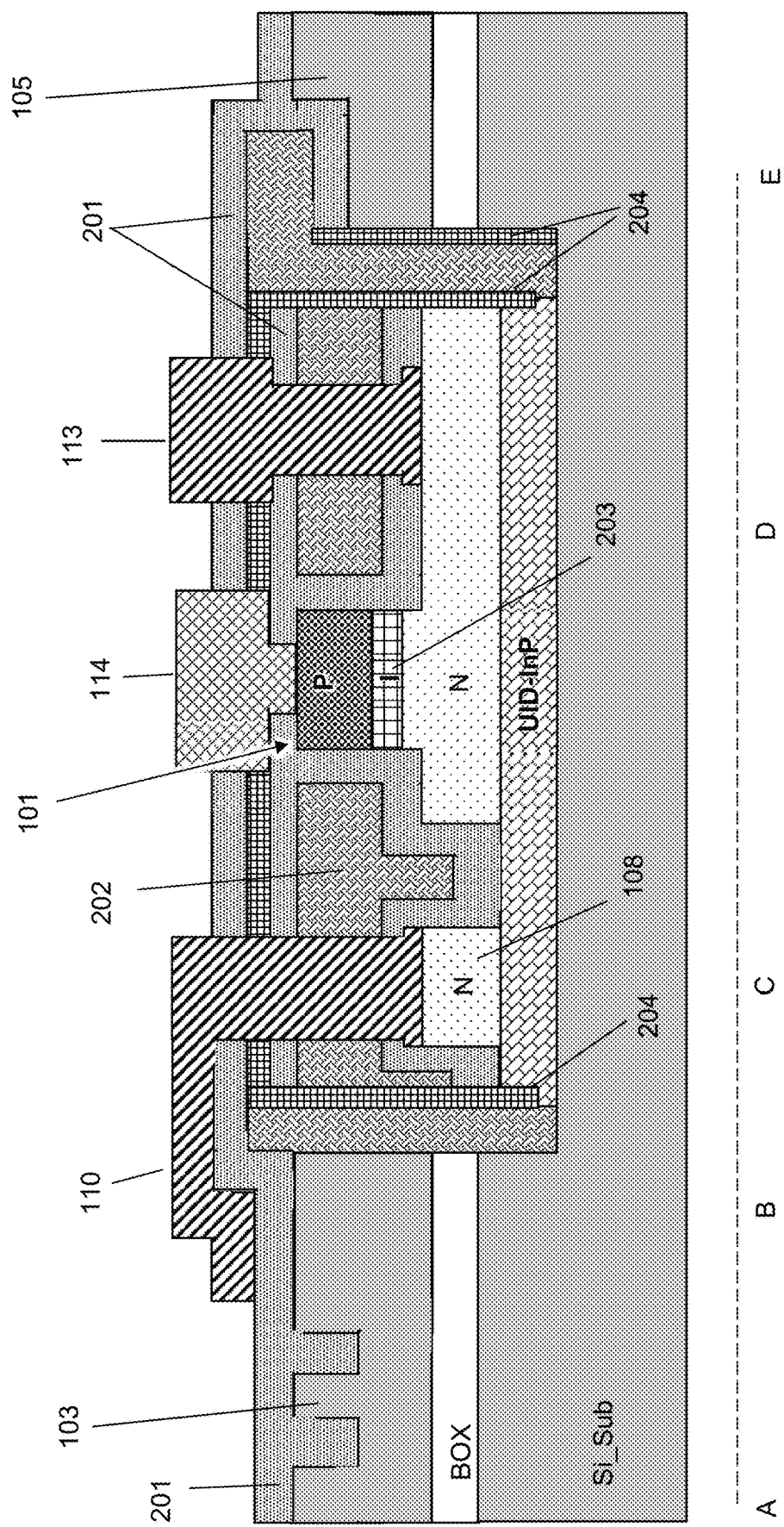
FIG. 2A is a section view of FIG. 1 along the line ABODE.

FIG. 2A is a section view of FIG. 1 along the line ABODE. The section view shows, in more detail, the structure of the optoelectronic device 100. Shown in this view, which was omitted from FIG. 1, is silicon dioxide passivation layer 201 which extends across the upper surface of the device 100. The section view shows that the cavity in the silicon-on-insulator platform extends through the device layer (upper silicon layer), through the buried oxide layer (BOX), and part way into the silicon substrate (Si_Sub). The exact depth of the cavity is chosen such that an optical mode in the III-V semiconductor based waveguide 101 is aligned with an optical mode in the silicon waveguide 103.

The section view shows that the waveguide 101 is formed from a p-doped upper layer, an intrinsic layer 203, and an n-doped lower layer. Of course the order may be reversed. The p-doped layer is connected to the p-electrode 114, and the n-doped layer is connected to the n-electrode 113. The heater 108 can also be seen, connected to heater electrode 110 via a trace. The heater in this example is formed from an n-doped region which is electrically isolated from the n-doped region within the waveguide 101.

The section view also shows the waveguide taper 105, which tapers from a first optical mode with a first width and height to a second optical mode with a second width and height. Further, detail on the coupling between the III-V semiconductor waveguide 101 and silicon waveguide 103 is shown. Notably, antireflective coatings (ARC) are applied to the lateral sides of the device coupon and one or more sidewalls of the cavity. The remaining space between is filled with a dielectric, such as Benzocyclobutene (BOB) to act as a waveguide bridge.

Figure 2B:
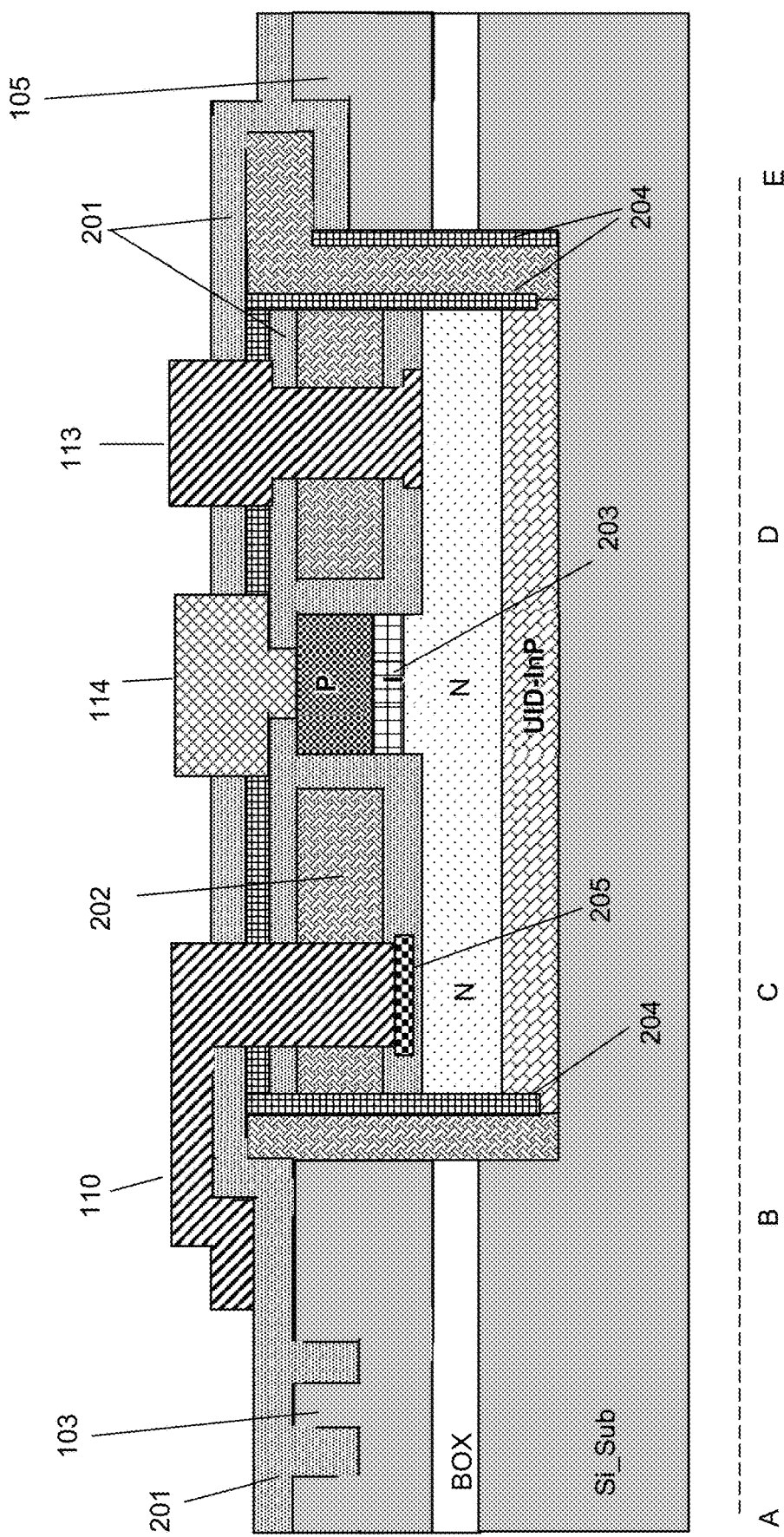
FIG. 2B is a section view of FIG. 1 along the line ABODE showing a variant optoelectronic device.

FIG. 2B is a section view of FIG. 1 along the line ABODE showing a variant optoelectronic device. Where the optoelectronic device of FIG. 2B shares features with that the device shown in FIG. 2A, like features are indicated by like reference numerals.

Notably, in FIG. 2B, heater 205 is provided as a metal region located within a silicon dioxide portion 201 between the dielectric 202 and n-doped region. The metal region may be formed from: titanium, titanium nitride, chromium, or nickel. A metal region provides greater control over the resistance value of the heater, and can be used to create more targeted heating; e.g. using a wider metal region for lower resistance heating away from where heating is desired, and a thinner metal region for higher resistance and greater heating where desired.

Figure 2C:
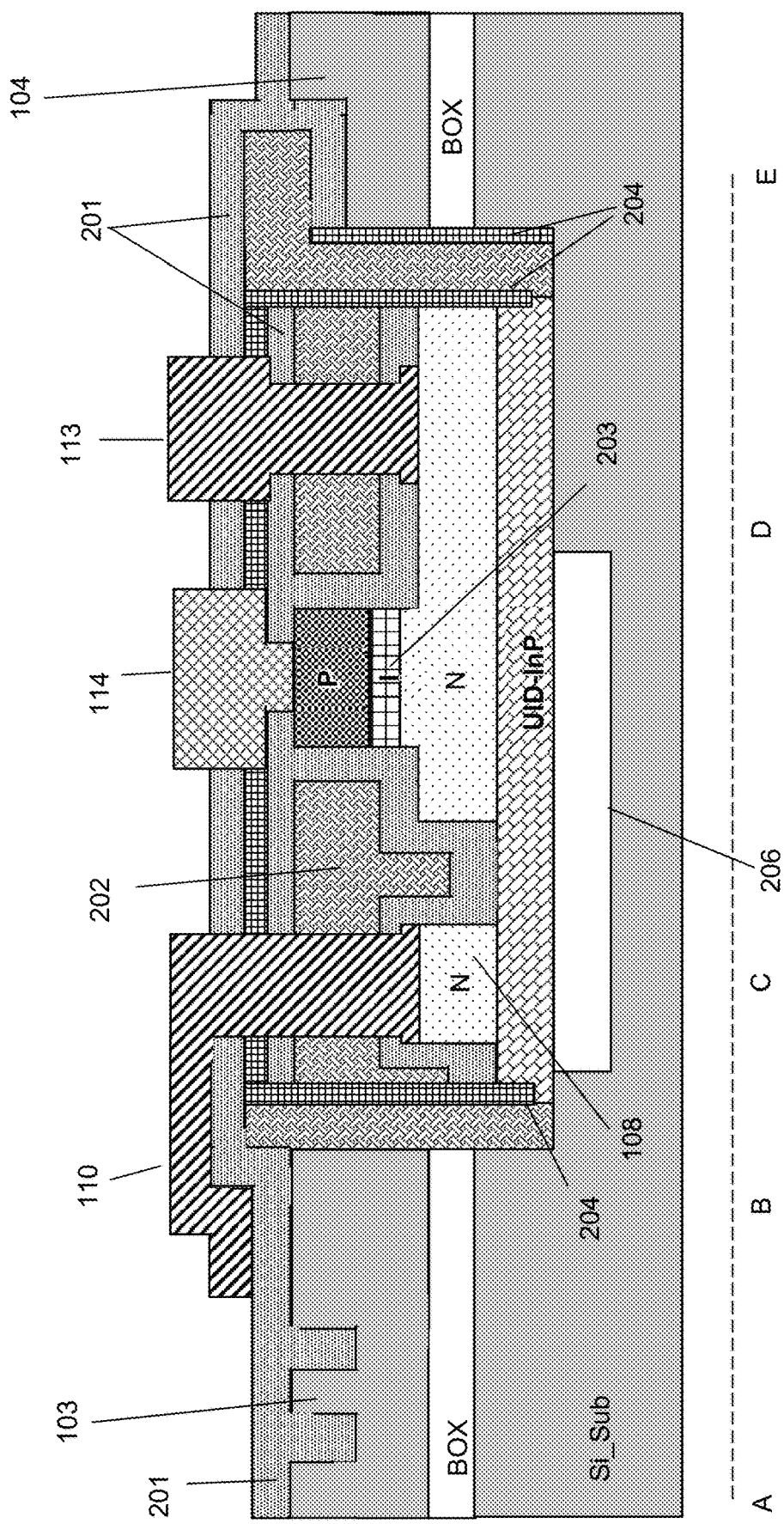
FIG. 2C is a section view of FIG. 1 along the line ABODE showing a variant optoelectronic device.

FIG. 2C is a section view of FIG. 1 along the line ABODE showing a variant optoelectronic device. Where the optoelectronic device of FIG. 2C shares features with that the device shown in FIG. 2A, like features are indicated by like reference numerals.

The device in FIG. 2C differs from that shown in FIG. 2A in that a thermal isolation cavity 206, preferably containing only air, is provided under a portion of the device coupon. The thermal isolation cavity increases the efficiency of the heater, by at least partially thermally isolating the heater and p-i-n junction from the substrate. The thermal isolation cavity may have a shape corresponding to the shape of the heater, i.e. a 'U' shape. The thermal cavity may be square, or rectangular, or have any shape as long as there is sufficient room for the coupon to bond to the cavity and not affect the mechanical reliability of the coupon.

Figure 2D:
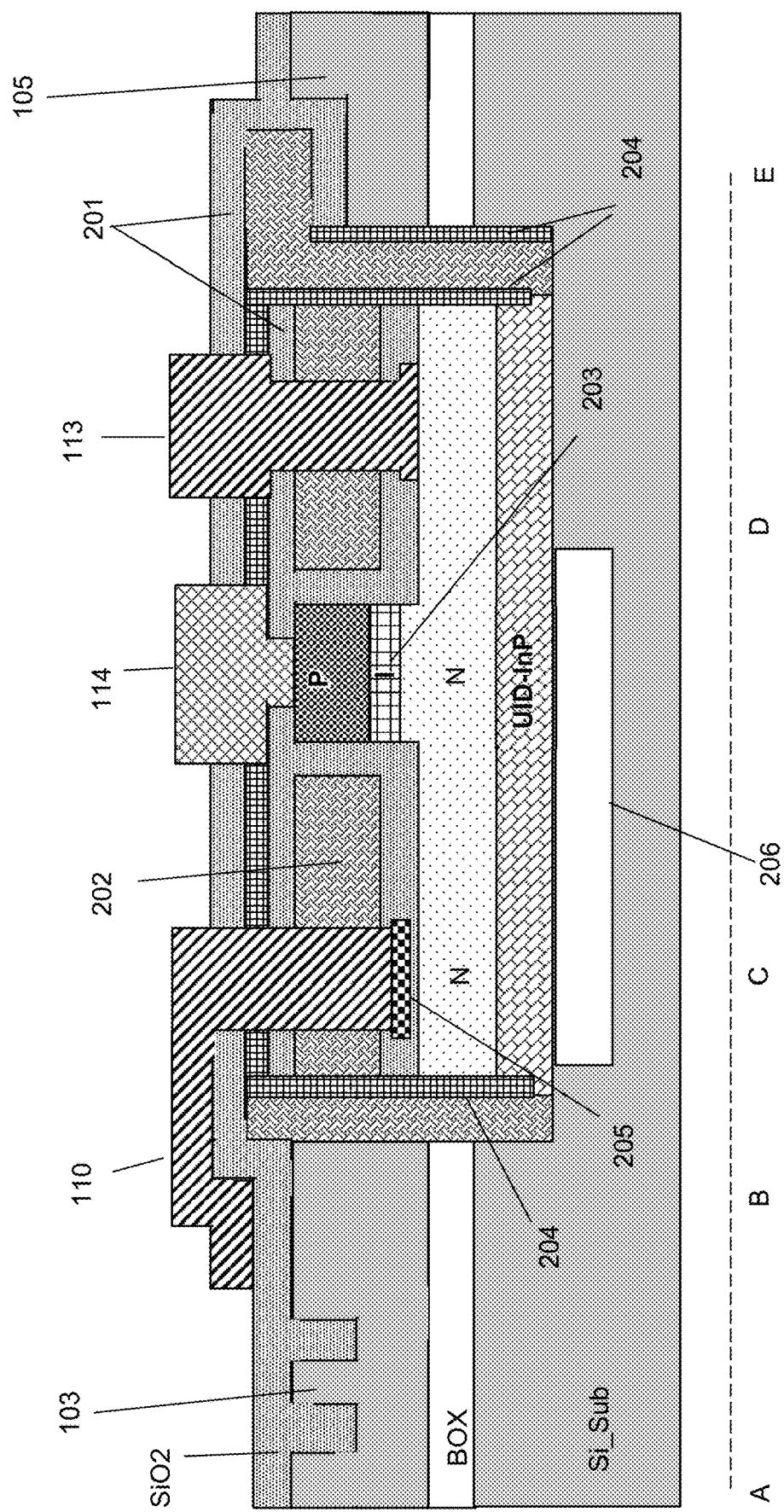
FIG. 2D is a section view of FIG. 1 along the line ABODE showing a variant optoelectronic device.

FIG. 2D is a section view of FIG. 1 along the line ABODE showing a variant optoelectronic device. Where the optoelectronic device of FIG. 2D shares features with that the device shown in FIG. 2A, like features are indicated by like reference numerals.

The device in FIG. 2D differs from that shown in FIG. 2A in that heater 205 is provided as a metal region located within a silicon dioxide portion 201 between the dielectric 202 and n-doped region. The metal region may be formed from: titanium, titanium nitride, chromium, or nickel. Further, a thermal isolation cavity 206, preferably containing only air, is provided under a portion of the device coupon. The thermal isolation cavity increases the efficiency of the heater, by at least partially thermally isolating the heater and p-i-n junction from the substrate.

Figure 3I:
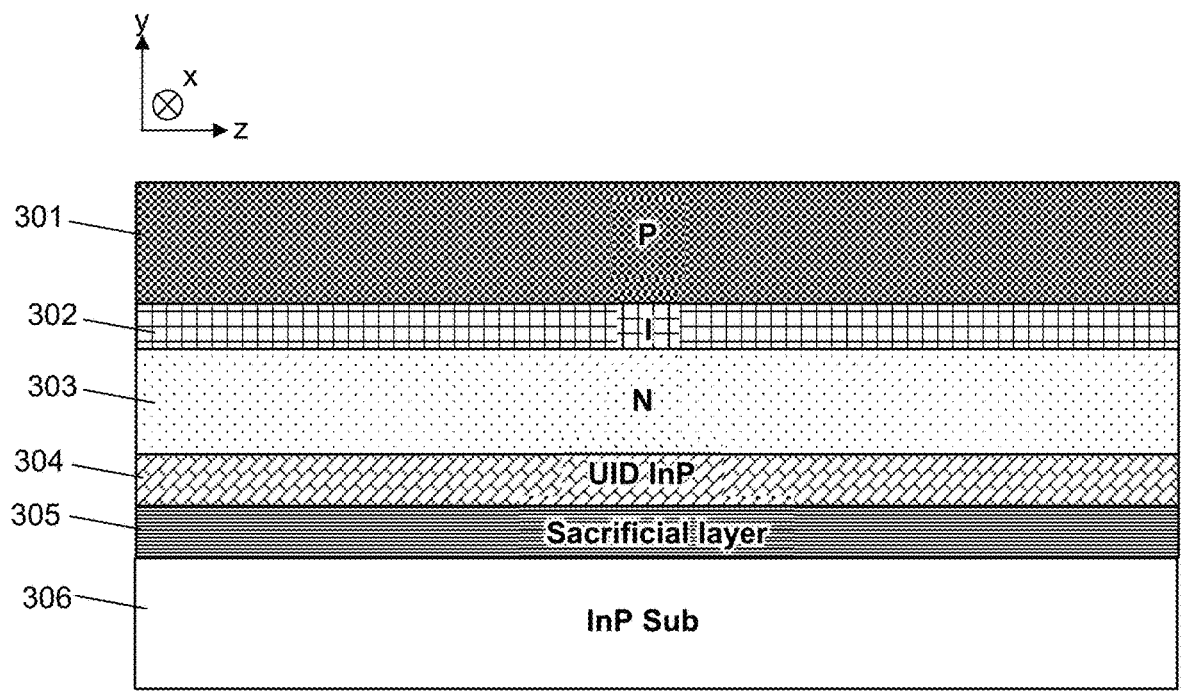
FIGS. 3(i)-3(xiv) show various manufacturing stages of a III-V semiconductor based device coupon according to embodiments of the present invention.
Figure 3:
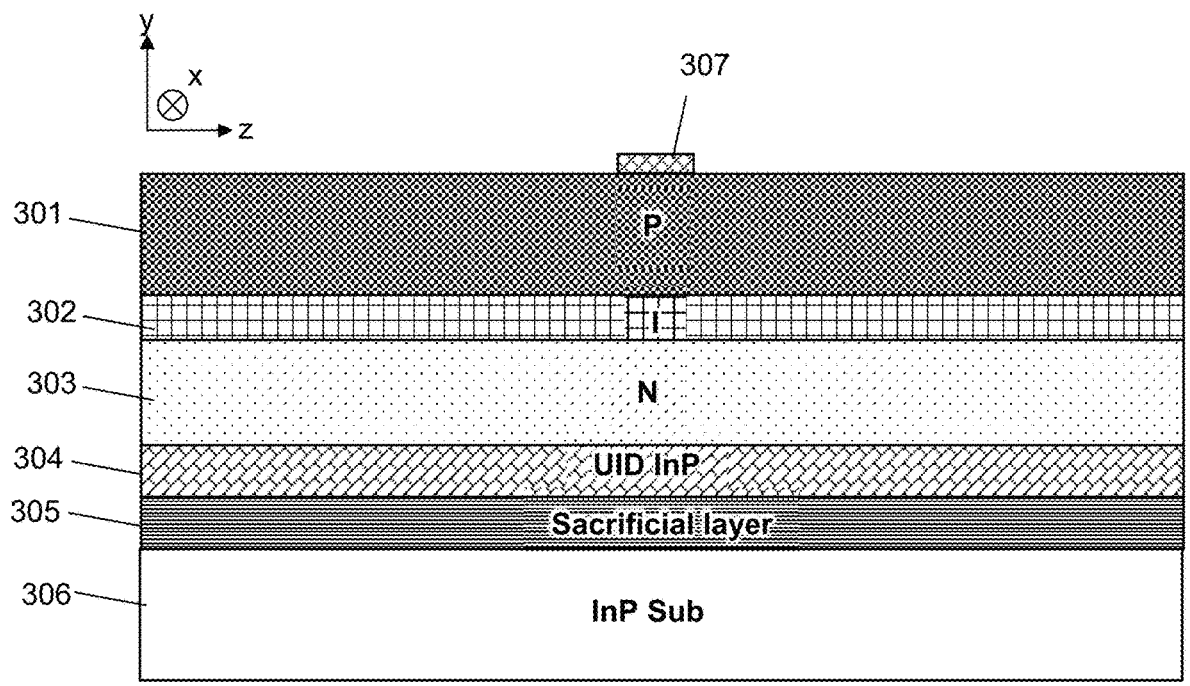
Figure 3:
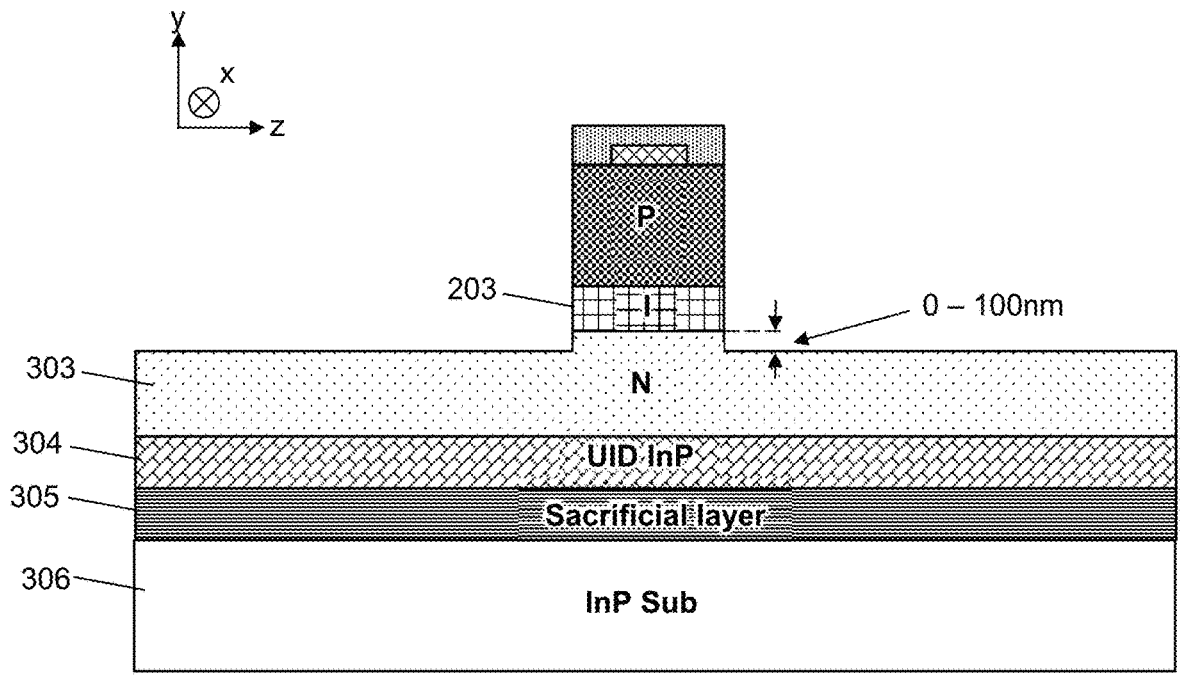

FIGS. 3(i)-3(xiv) show various manufacturing stages of a III-V semiconductor based device coupon according to embodiments of the present invention.

In a first step, shown in FIG. 3(i), a multi-layered stack of III-V semiconductor layers is provided. From an uppermost layer downwards, the stack comprises: a p-doped layer 301; an intrinsic (undoped) layer 302; an n-doped layer 303; an intrinsic or unintentionally doped indium phosphide, InP, layer 304; a sacrificial layer 305; and a InP substrate. In some examples, each of the p-doped layer 301, intrinsic layer 302, and n-doped layer 303 may be formed of a plurality of sub-layers, each with different compositions and/or different doping concentrations. The p-doped layer(s) may be formed from InGaAs, InGaAsP, InP, and AlInAs. The intrinsic layer(s) may be formed from AlInGaAs multiple quantum wells and an InGaAsP spacer layer. The n-doped layer(s) may include InP with various doping levels. The sacrificial layer(s) may include InGaAs and AlInAs.

Next, in a step shown in FIG. 3(ii), a strip of gold or other conductor 307 is deposited over the uppermost surface of the stack to act as a seed for a metallization step performed subsequently. After, in a step shown in FIG. 3(iii), a hard mask 308 is deposited and patterned to define the III-V semiconductor based waveguide which will be fabricated from the multi-layered stack. In this example, the hard mask 308 is around 500 nm wide (as measured in the 'y' direction) and is formed of silicon dioxide ($SiO_2$).

Figure 3V:
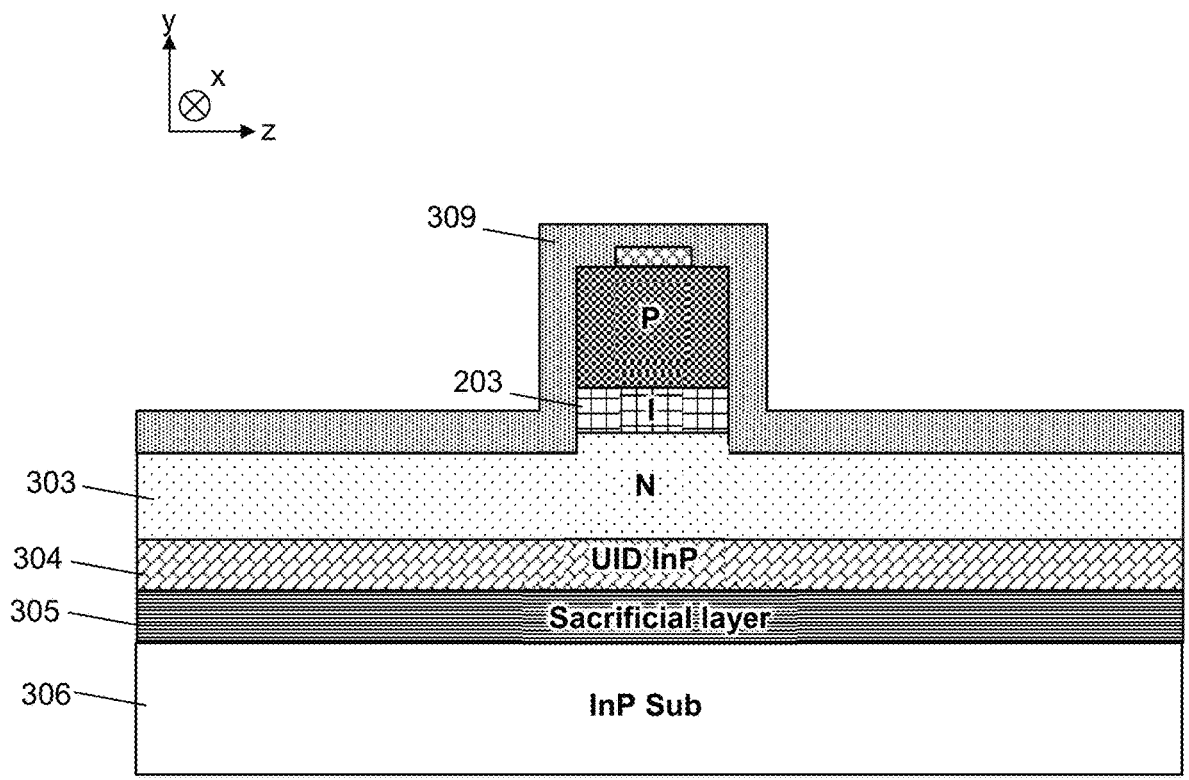
Figure 3:
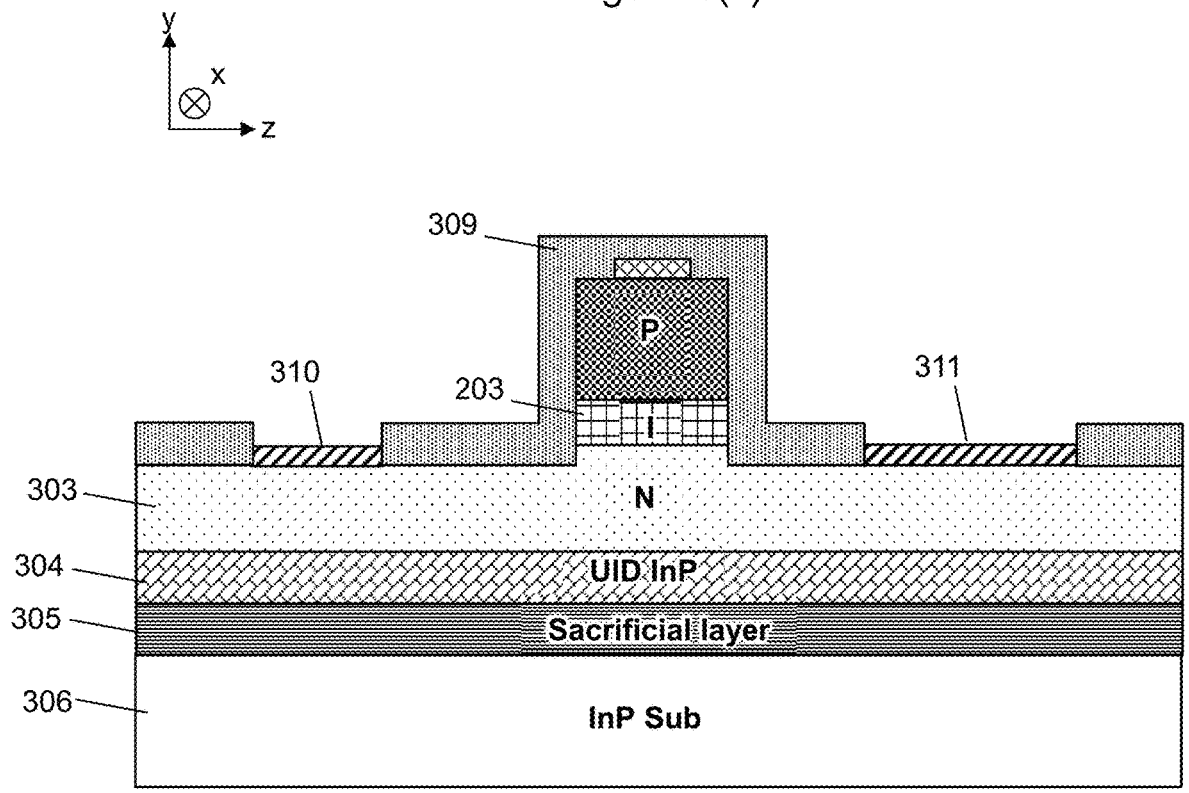
Figure 3:
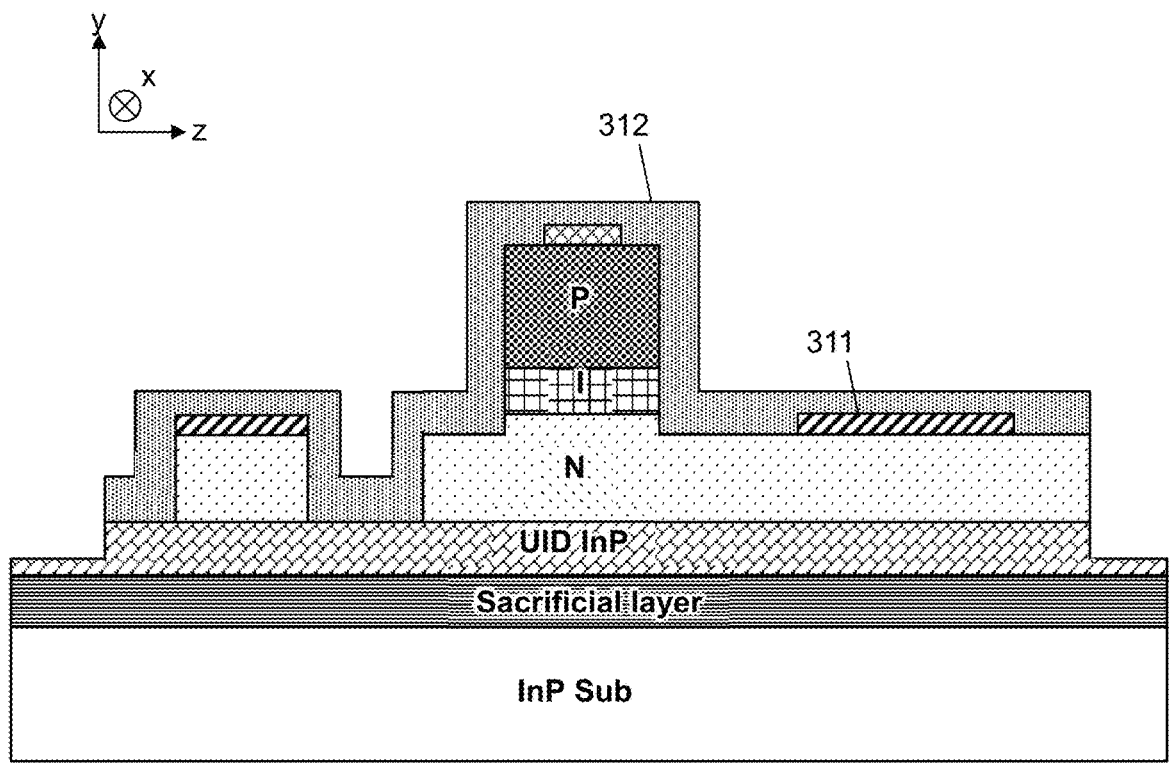

After the hard mask 308 has been provided, an etch is performed. The etch extends completely through the p-doped and intrinsic layers, and may extend partially into the n-doped layer 303. This partial etch is to ensure that the optical mode is fully, and strongly, confined, as well as to ensure it is possible to provide an electrical contact to the n-layer. This is shown in FIG. 3(iv). The over etch into the n-layer may be around 100 nm into the n-doped layer. This etch defines the geometry of the III-V semiconductor based waveguide. After this etching step, the hard mask 308 is removed and a passivation layer 309 is deposited, which in this example is formed of a 300 nm silicon dioxide layer. The result of this is shown in FIG. 3(v).

Next, two windows are opened in the passivation layer through to the n-doped layer 303 and gold or another conductor is deposited through these two windows onto the upper surface of the n-doped layer. The result of this is shown in FIG. 3(vi). One provides a heater electrode seed 310 for a heater electrode provided in a subsequent metallization step, and the other provides an n-electrode seed 311 for an n-electrode provided in a subsequent metallization step. After the seeds 310 and 311 are provided, further passivation layer 312 is provided to enclose the upper surfaces of the seeds as shown in FIG. 3(vii). In this example, a further 200 nm of silicon dioxide is provided resulting in a passivation layer having a thickness of 500 nm (asides from the location of the seeds, where it has a thickness of around 200 nm).

Next, in a step shown in FIG. 3(viii) the structure is patterned and the heater 108 etched from the n-doped region. As shown, the heater is at least 3 µm and no more than 10 µm in width, and is separated from the remaining n-doped region by at least 3 µm and no more than 6 µm. The etch is performed such that the heater is electrically isolated from the n-doped region 303. The etch is performed so that at least 2 µm and no more than 5 µm of n-doped region 303 extends from the now formed waveguide towards the heater 108. This etch also provides an isolation region for the p-electrode 114 (not shown). Typically, the n-doped region 303 has a sheet resistance of between 4 and 6Ω per square, and so the specific dimensions of any given heater will depend on the temperature requirements of the EAM in which it is fabricated. This requirements typically include: driving voltage; power consumption; temperature to be reached; and heating time.

After the provision of the heater, in a step shown in FIG. 3(ix), a further etch is performed to define the III-V semiconductor waveguide facets (the coupling interfaces between the III-V semiconductor based waveguide and the silicon waveguides, once provided in the silicon-on-insulator platform). Further silicon dioxide is also provided.

Figure 3X:
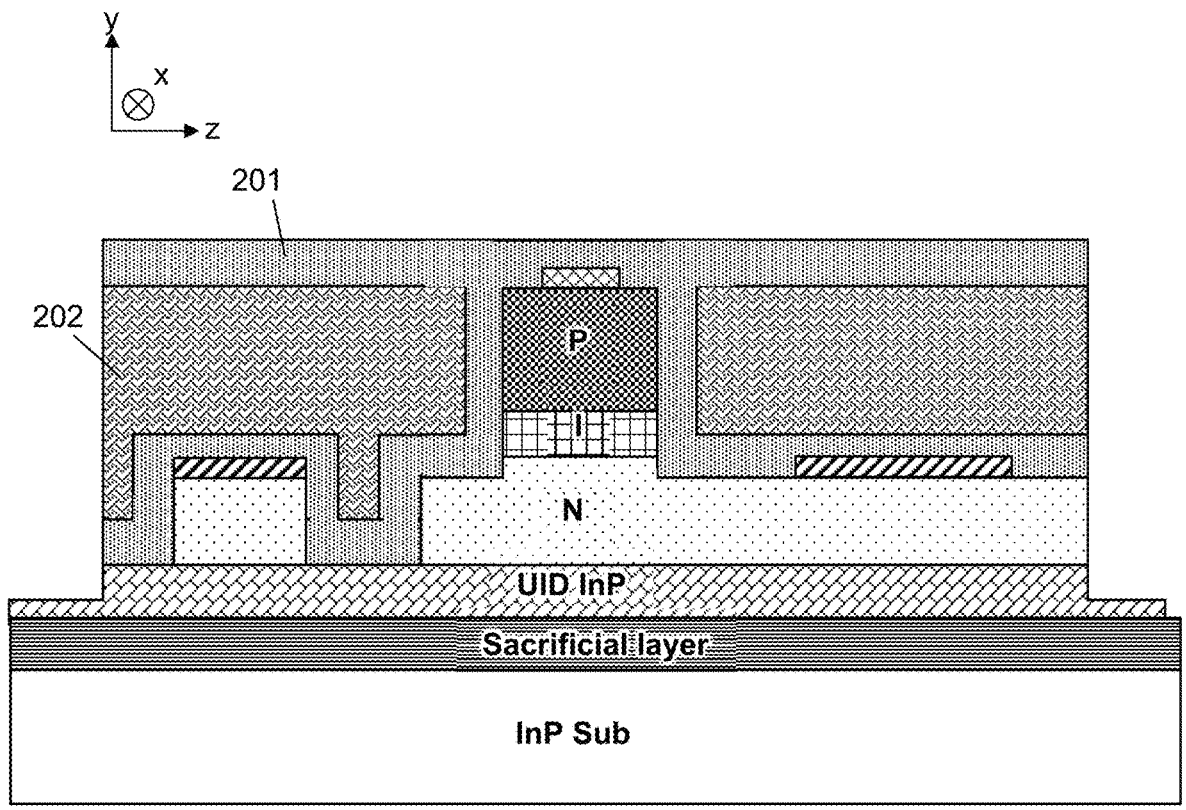
Figure 3:
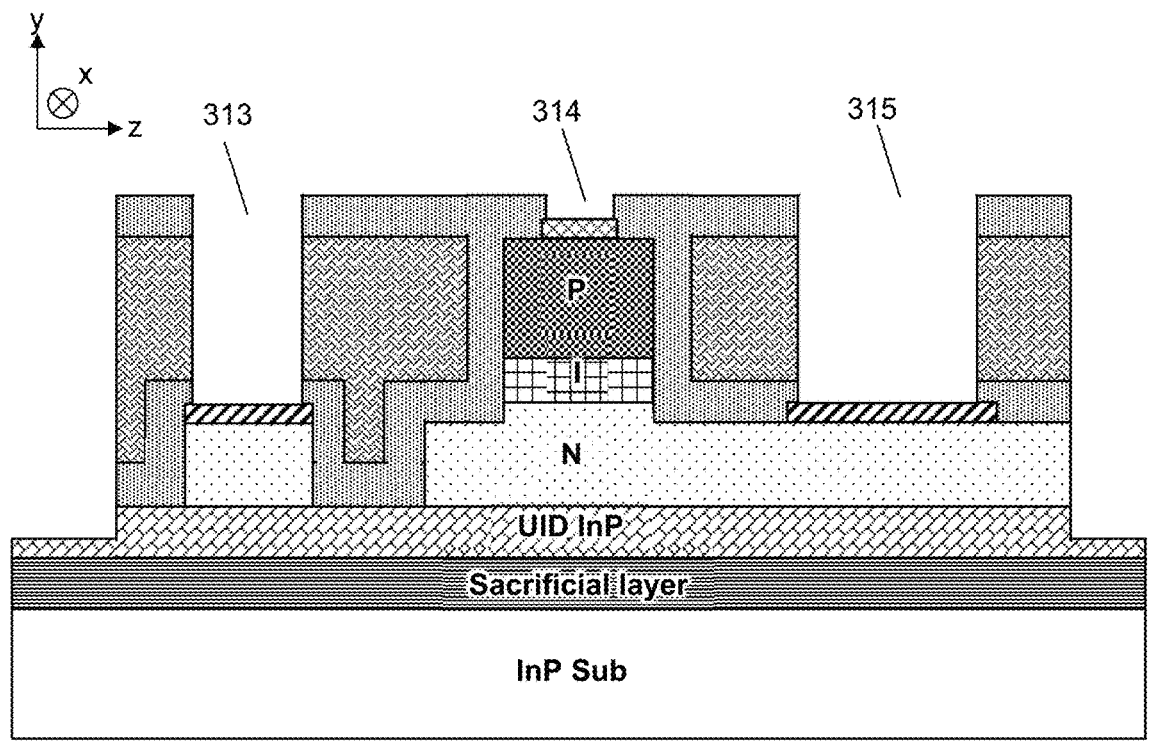

Next, in a step shown in FIG. 3(x), a dielectric material 202 (such as Benzocyclobutene) is used to refill the spaces previously etched, with the exception of the waveguide facet etch. After the dielectric is provided, a planarization etch is performed and then the device is covered with a further layer of silicon dioxide 201. Subsequently, in a step shown in FIG. 3(xi), a heater via 313, p-electrode via 314, and n-electrode via 315 are opened exposing the upper surfaces of the heater seed, p-electrode seed, and n-electrode seed. This allows a subsequent metallization step to be performed, the result of which is shown in FIG. 3(xii). The metallization step provides heater electrode 109, p-electrode 114, and n-electrode 115. The heater electrode extends through the silicon dioxide and dielectric to electrically connect to the heater 108. Similarly, the p-electrode and n-electrode extend down to respectively electrically connect to the p-doped region and n-doped region. The n-electrode connects to a portion of the n-doped region which is laterally spaced from the intrinsic region.

After the metallization step, in a step shown in FIG. 3(xiii), an antireflective coating 316 is provided around the lateral and upper surface of the device coupon 102. The antireflective coating is typically formed of silicon nitride, for example $Si_3N_4$. After this deposition, the device coupon 102 is patterned and etched so as to provide a generally rectangular device coupon (as viewed from above). Finally, a photoresist tether 317 is provided over the lateral and upper surfaces of the device coupon, and the sacrificial layer is etched away. The device coupon is thus held to the InP substrate by the photoresist tether 317 only, as shown in FIG. 3(xiv).

Figure 4I:
FIGS. 4(i)-4(vi) show various manufacturing stages of a silicon-on-insulator platform according to embodiments of the present invention.
Figure 4:
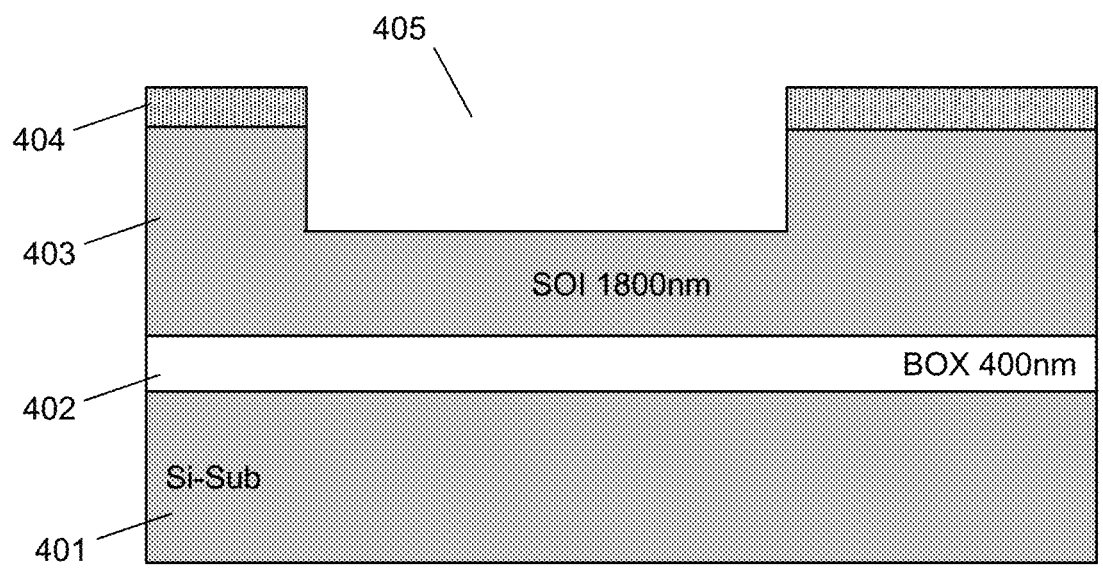
Figure 4:
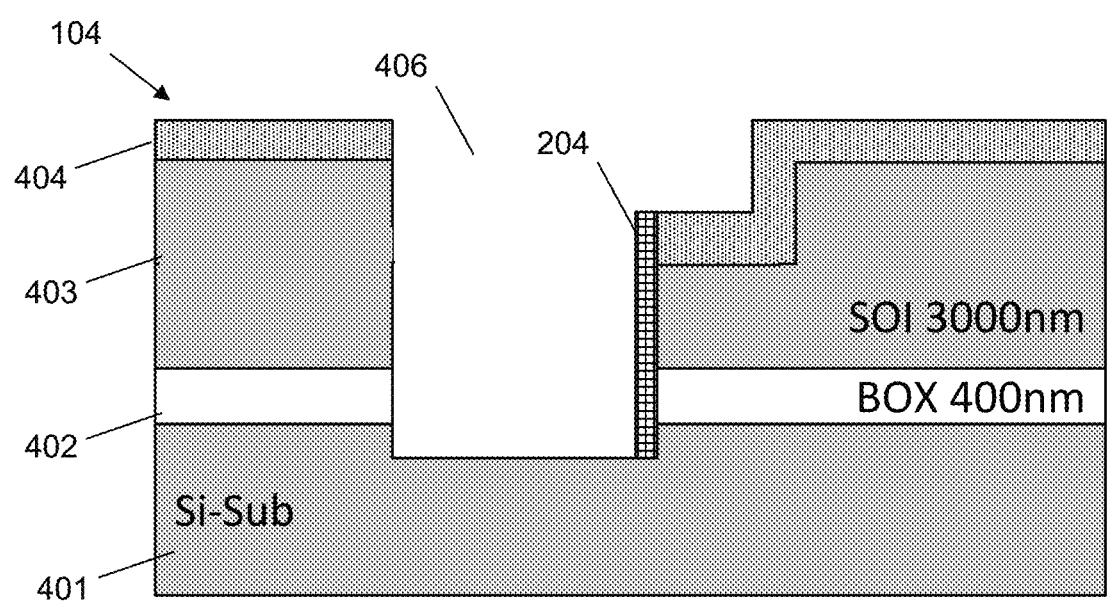

FIGS. 4(i)-4(vi) show various manufacturing stages of a silicon-on-insulator platform according to embodiments of the present invention. In a first step, shown in FIG. 4(i), a silicon-on-insulator, SOI, wafer is provided. The SOI wafer comprises a silicon substrate 401, Si-Sub, on top of which is a buried oxide layer (typically $SiO_2$) 402, BOX. On top of the buried oxide is a SOI layer 403, also referred to as a device layer. The buried oxide layer is around 400 nm tall as measured from an uppermost surface of the substrate to an uppermost surface of the buried oxide layer. The device layer is around 3000 nm or 3 µm tall, as measured from an uppermost surface of the BOX layer 402 to an uppermost surface of the SOI layer 403.

Next, in a step shown in FIG. 4(ii), an etching mask 404 is provided over a portion of the device layer 403. The exposed device layer is then etched, so that a taper cavity 405 is provided. The taper cavity has a depth of around 1200 nm, such that an 1800 nm tall portion of SOI remains. This etch thereby provides waveguide taper 105 discussed above, from a 3 μm silicon waveguide to a 1.8 μm silicon waveguide.

Further etching mask 404 is then applied, and device cavity 406 is subsequently etched as shown in FIG. 4(iii). The depth of the device cavity is chosen such that an optical mode of the 1.8 μm silicon waveguide is vertically aligned with an optical mode of the III-V semiconductor based waveguide which is to be bonded to a bed of the device cavity. The surface roughness of the bed of the cavity should be less than 1 nm. This surface roughness is typically measured through atomic force microscopy, and may be defined as a surface roughness parameter $R_a$, $R_z$, or $R_{MAX}$. The measured area is typically around 10 μm by 10 μm.

After the device cavity 406 has been provided, an anti-reflective coating is provided on the sidewalls of the device cavity which will face the III-V semiconductor based waveguide in the device coupon 102 i.e. the 1.8 μm silicon waveguide facets. This anti-reflective coating is typically formed of silicon nitride, e.g. $Si_3N_4$, and is around 180 nm in width.

Figure 4V:
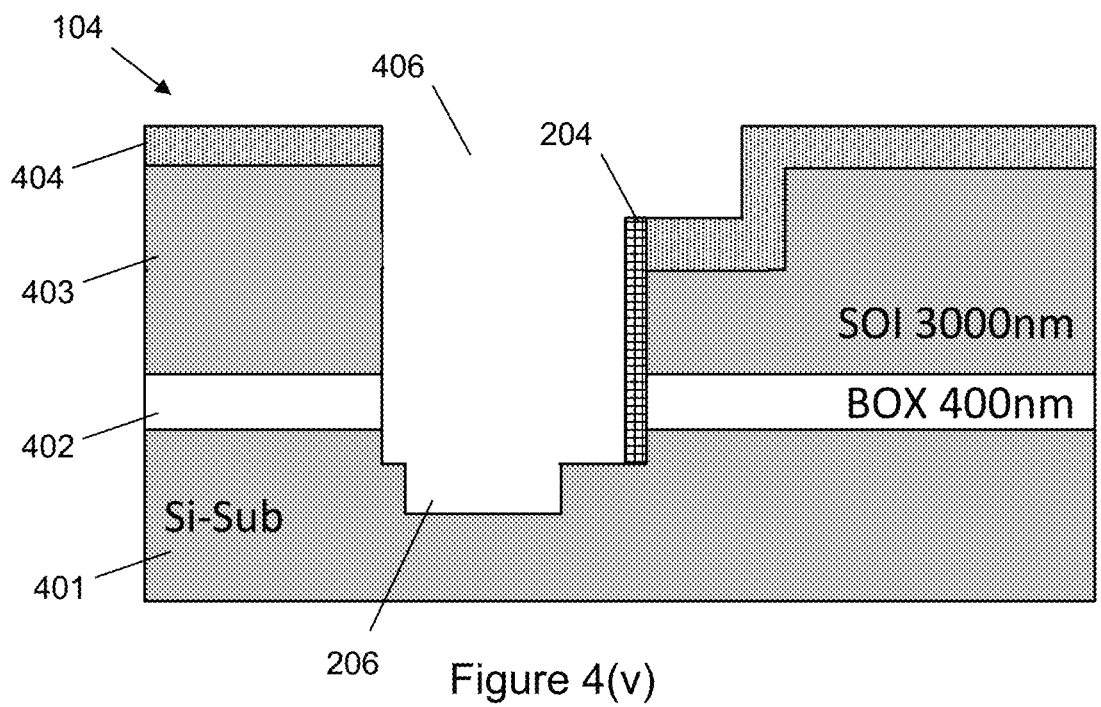
Figure 4:
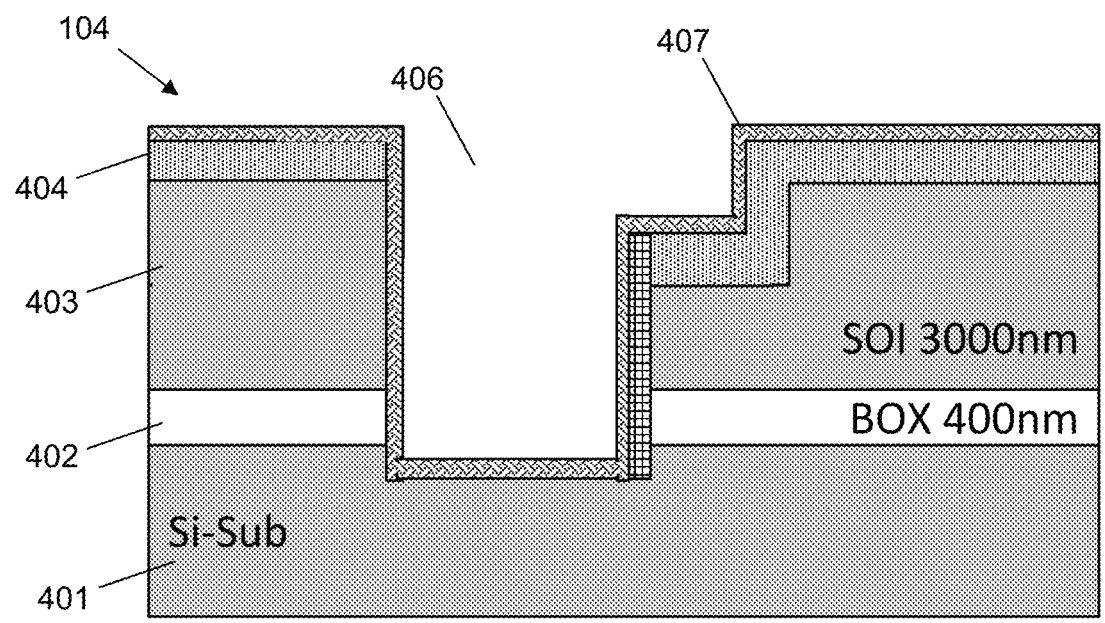

Optionally, in a step shown in FIG. 4(v), thermally isolating cavity 206 can be etched into a portion of the bed of the device cavity. Further optionally, in a step which may be performed in addition to or instead of etching the thermally isolating cavity, an adhesive layer 407 may be provided. This is shown in FIG. 4(vi). The adhesive layer may be a spun coated dielectric, for example BCB or Intervia (available from Kayaku Advanced Materials). The adhesive layer, if provided, may have a thickness of at least 30 nm and no more than 100 nm.

Figure 5I:
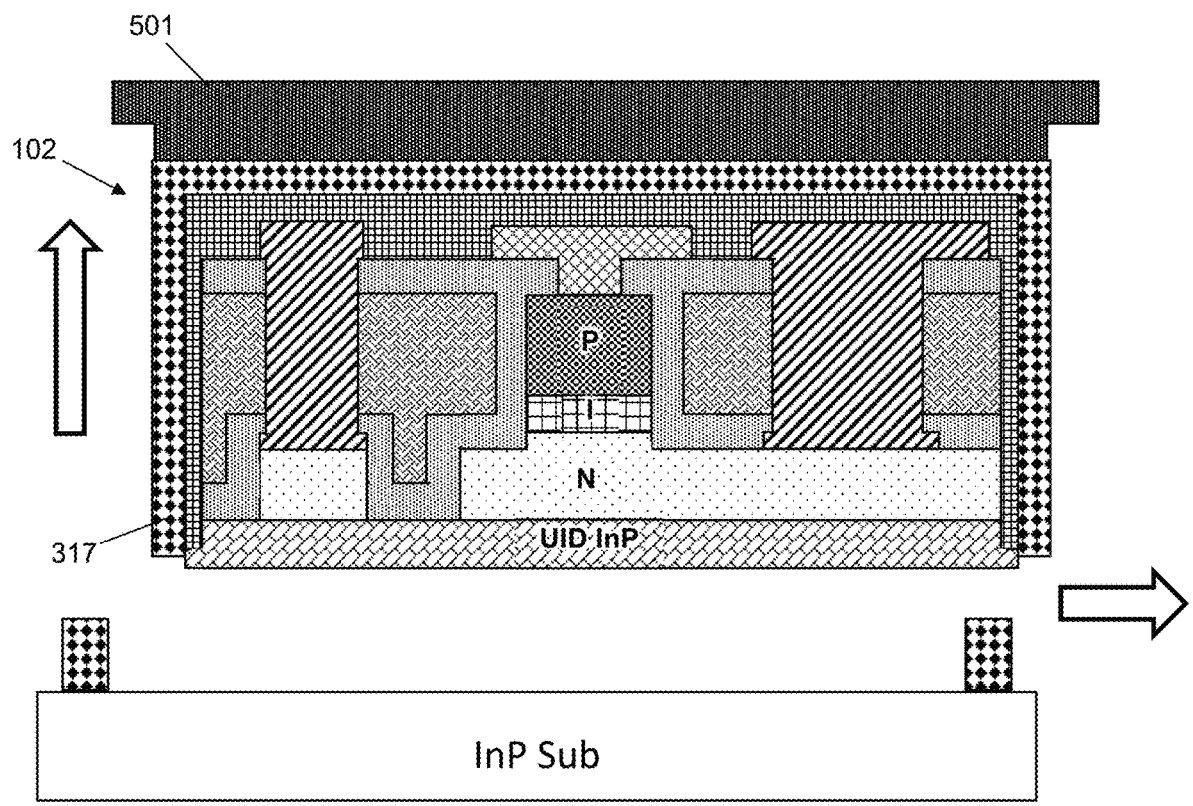
FIGS. 5(i)-5(x) show various manufacturing stages of an optoelectronic device according to embodiments of the present invention.
Figure 5:
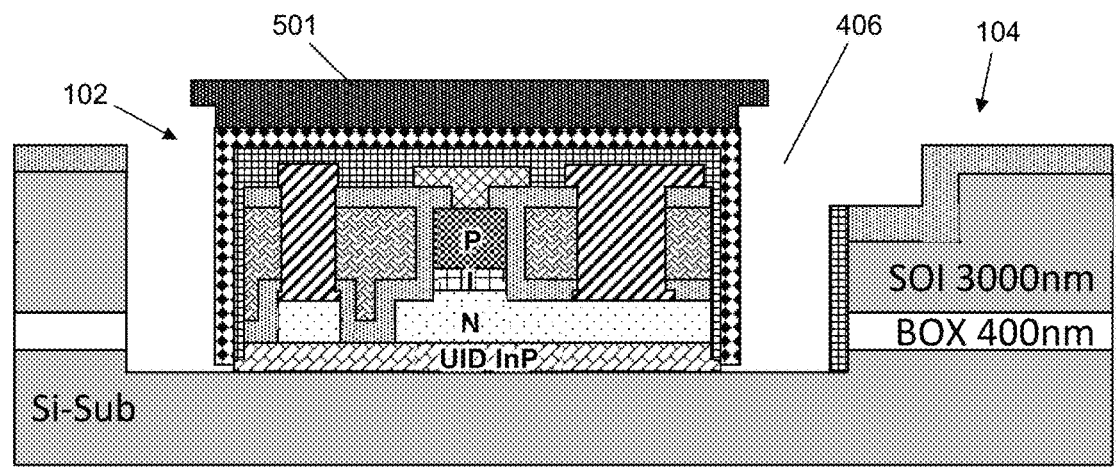
Figure 5:
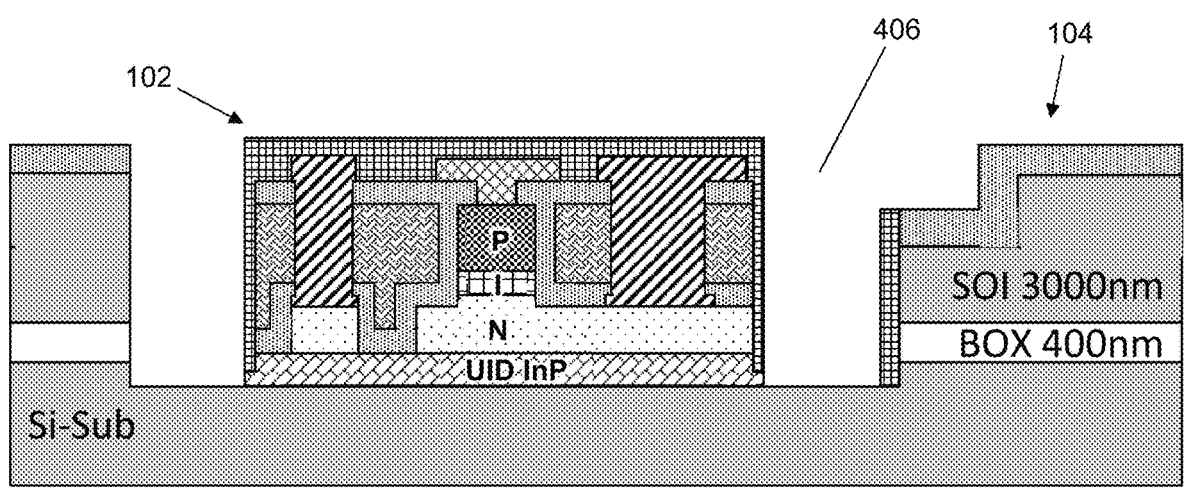
Figure 5V:
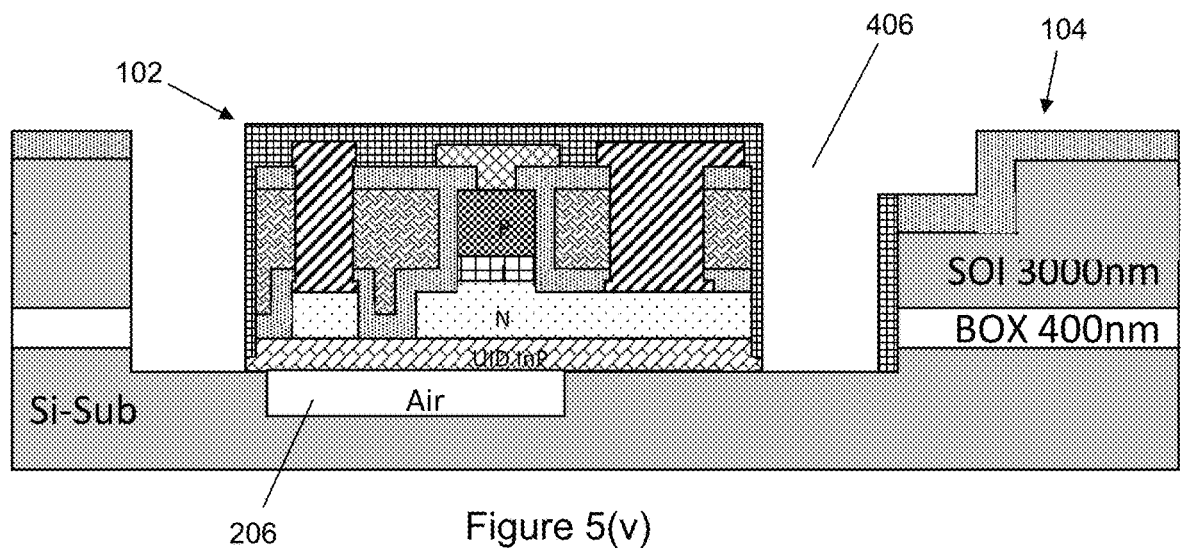
Figure 5:
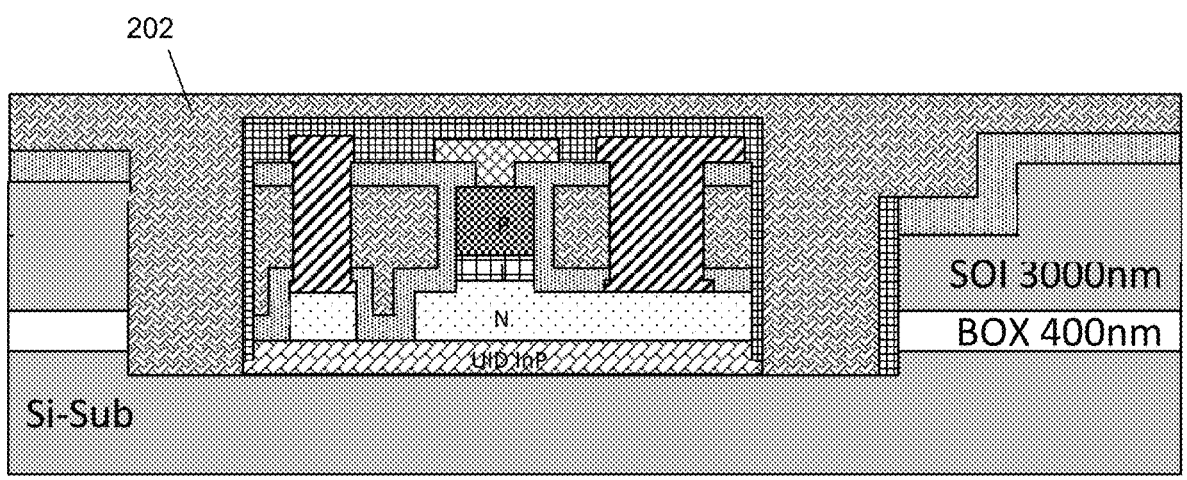
Figure 5:
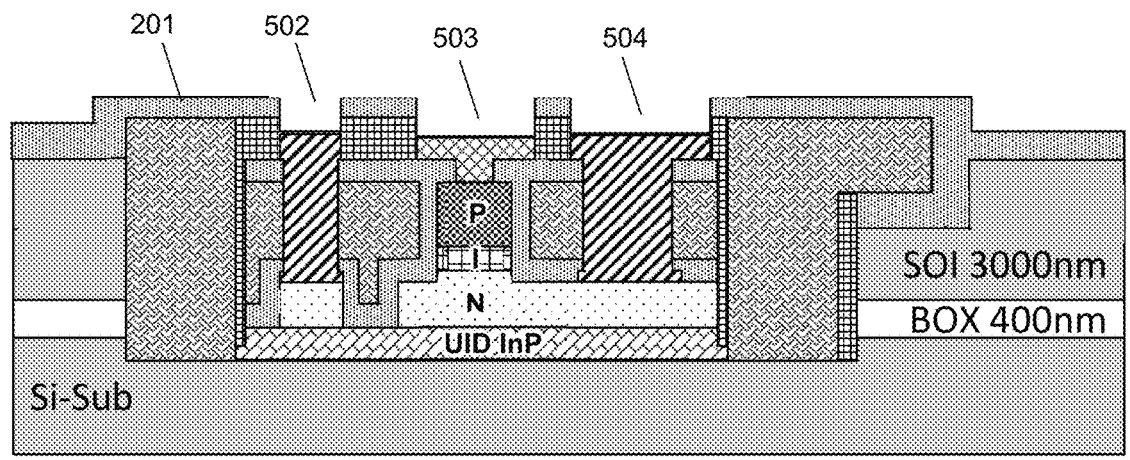
Figure 5X:
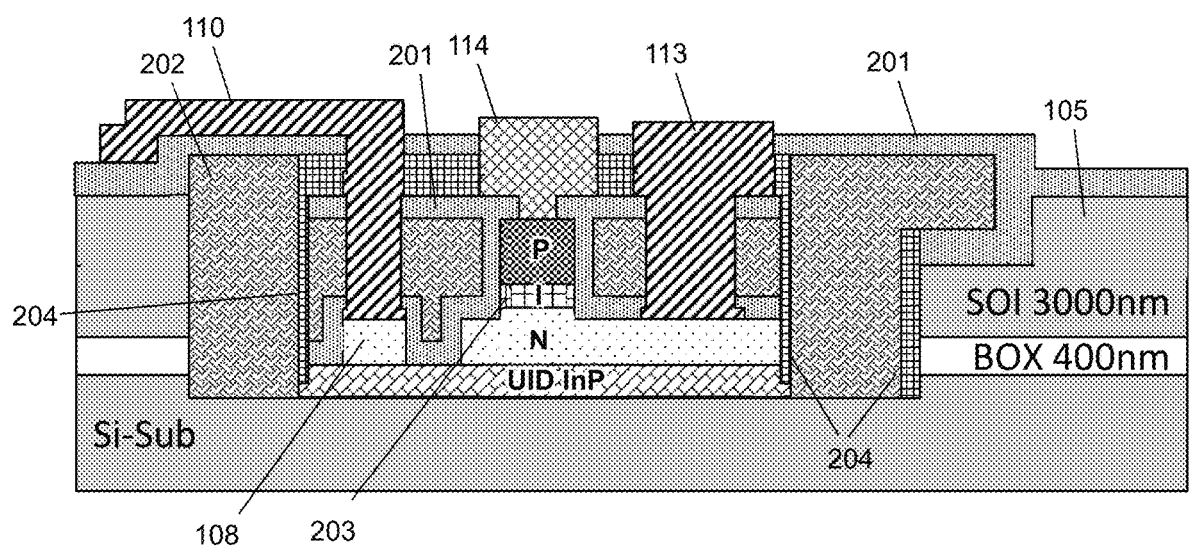

FIGS. 5(i)-5(x) show various manufacturing stages of an optoelectronic device according to embodiments of the present invention. The steps shown in FIGS. 5(i)-5(x) are along the same ABODE section view as FIGS. 2A-2D. In a first step, shown in FIG. 5(i), a stamp 501 (preferably formed of elastomer) is attached to photoresist 317 covering the upper surface of the device coupon 102. The device coupon 102 is then released from the InP substrate. Next, as shown in FIG. 5(ii), the device coupon 102 is printed into the device cavity 406 of the silicon-on-insulator platform 104. In this step, x and z alignment (i.e. lateral alignment) takes place such that the III-V semiconductor based waveguide is aligned with the silicon waveguide(s) in the silicon-on-insulator platform 104.

The stamp is then removed, as shown in FIG. 5(iii) and the device coupon 102 is retained within the cavity 406. Next, the photoresist tether 317 is removed (for example by a dry etch) and the device coupon is bonded to the device cavity 406. This bonding can be performed, for example, by annealing the combination of coupon and platform at a temperature of at least 280° C. and no more 300° C. for at least 1 hour and no more than 15 hours. The result of this is shown in FIG. 5(iv). FIG. 5(v) shows a variant where the optional thermally isolating cavity 206 has been etched into the bed of the device cavity.

Once the device coupon 102 has been bonded to the silicon-on-insulator platform 104, a dielectric 202 is spun coated and thermally cured. This thermal curing is, in one example, performed at around 280° C. for around 60 minutes in a nitrogen atmosphere ($N_2$). The result of this is shown in FIG. 5(vi). The dielectric 202 functions as a bridge between the silicon waveguide(s) 103 and the III-V semiconductor based waveguide 101. Next, the dielectric extending above the uppermost surface of the device coupon 102 is etched back. This is shown in FIG. 5(vii).

Next, a silicon dioxide layer 201 is provided over the upper surface of the coupon and platform. The layer has a thickness of around 500 nm, and functions to passivate the manufactured optoelectronic device. The result of this step is shown in FIG. 5(viii). After the provision of the silicon dioxide layer 201, three openings are made: a heater contact opening 502; a p-electrode opening 503; and an n-electrode opening 504. A wire bonding or metallization process is then performed, as shown in FIG. 5(x), to provide the metal trace and pad 110 for the heater on the silicon-on-insulator platform, as well as the p-electrode 114 and n-electrode 113.

Figure 6I:
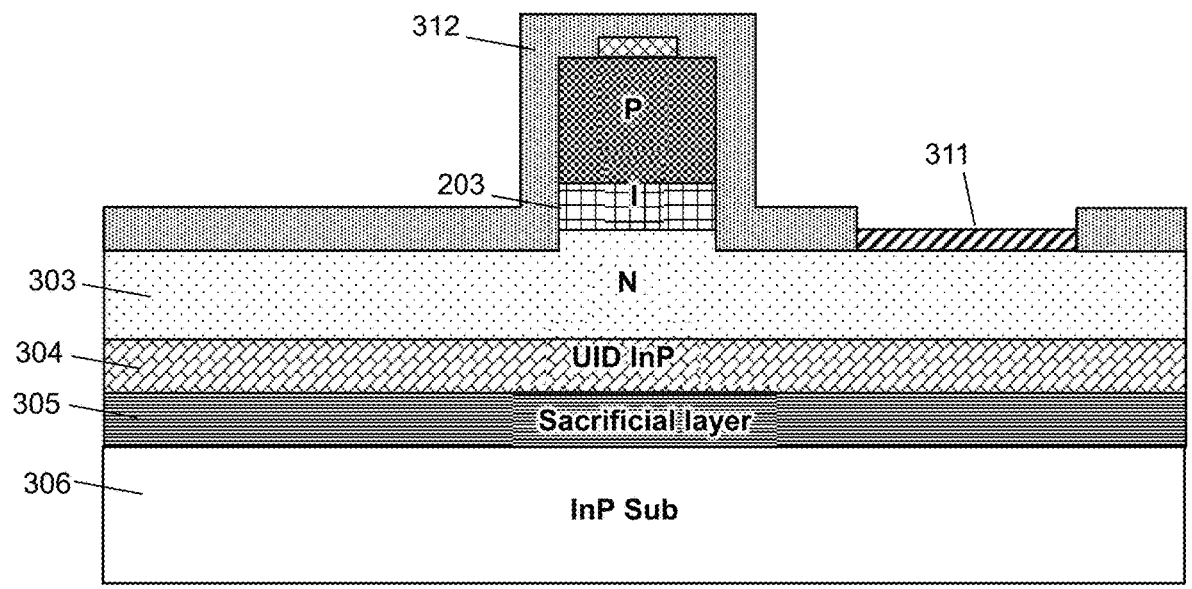
FIGS. 6(i)-6(iv) show a variant manufacturing process for a III-V semiconductor based device coupon according to embodiments of the present invention.
Figure 6:
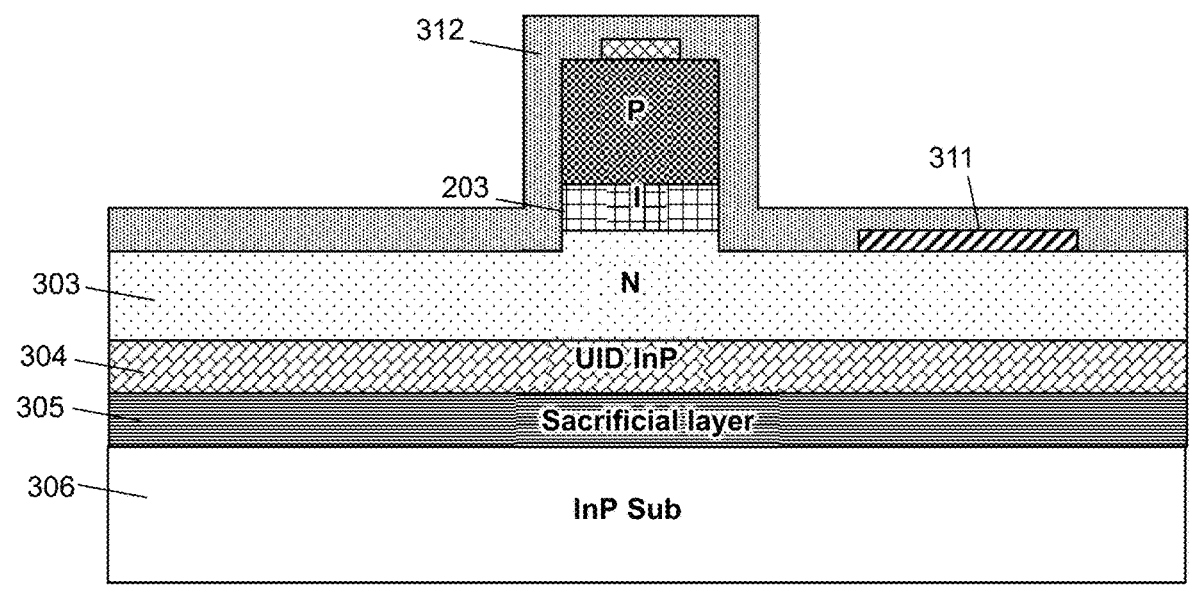
Figure 6:
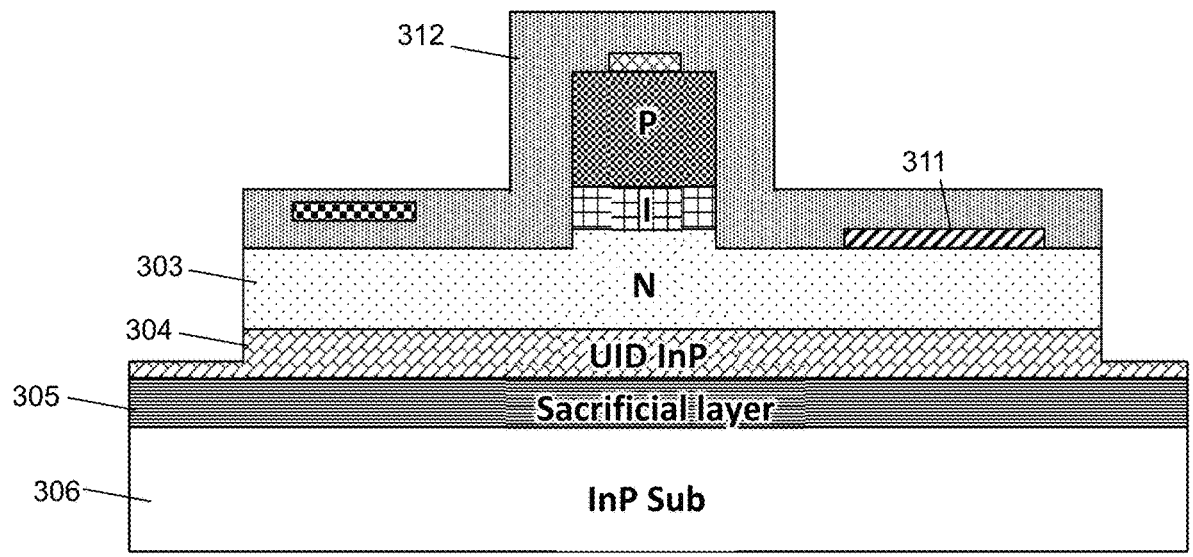

FIGS. 6(i)-6(iv) show a variant manufacturing process for a III-V semiconductor based device coupon according to embodiments of the present invention. The steps shown in FIGS. 3(i)-3(v) are performed first, and then the method moves to the step shown in FIG. 6(i). In this step, n-electrode seed metal 311 is provided on the upper surface of the n-doped region 303 through a window in the silicon dioxide layer 312.

Next, in a step shown in FIG. 6(ii), further silicon dioxide is provided over the structure. A 500 nm thick $SiO_2$ layer is therefore present over the structure asides from the region containing the seed metal 311, where it is around 200 nm thick. After this, in one or more steps not shown, an isolation region is etched for the p-electrode. Subsequently, in a step shown in FIG. 6(iii) heater 205 is deposited over a portion of the silicon dioxide layer 312. The heater is at least 3 μm, and no more than 10 μm, wide, and is positioned at least 3 μm and no more than 6 μm away from the closest portion of the III-V semiconductor based waveguide. The heater has a thickness (as measured from an uppermost surface of the silicon dioxide layer adjacent to the heater, to an uppermost surface of the heater) of at least 150 nm and no more than 350 nm. As discussed previously, the heater may be formed from titanium, titanium nitride, chromium, or nickel. After the heater has been provided, in a step shown in FIG. 6(iv), further silicon dioxide is provided to encapsulate the heater. Further, a waveguide facet etch is performed. After this step, the process continues as shown in FIGS. 3(x)-3(xiv).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

LIST OF FEATURES

| | |
|---|---|
| 100 | Optoelectronic device |
| 101 | III-V semiconductor based waveguide |
| 102 | III-V device coupon |
| 103 | Silicon waveguide |
| 104 | Silicon-on-insulator platform |
| 105 | Silicon waveguide taper |
| 106 | Silicon waveguide facet |
| 107 | III-V waveguide facet |
| 108 | Heater |
| 109 | Metal pad/electrode for heater |
| 110 | Metal trace and pad on SOI |
| 111 | SOI cavity filled with dielectric material |
| 112 | SOI cavity edge |
| 113 | III-V device coupon edge |
| 114 | P III-V semiconductor device electrode |
| 115 | N III-V semiconductor device electrode |
| 201 | Silicon dioxide |

-continued

| 202 | Dielectric material |
| --- | --- |
| 203 | Intrinsic region |
| 204 | Anti-reflective coating layer |
| 205 | Heater |
| 206 | Thermally isolating cavity |
| 301 | P-doped layer |
| 302 | Intrinsic layer |
| 303 | N-doped layer |
| 304 | UID Indium Phosphide (InP) layer |
| 305 | Sacrificial layer |
| 306 | Indium Phosphide (InP) substrate |
| 307 | Seed gold metal deposit |
| 308 | Silicon dioxide hard mask |
| 309 | 300 nm silicon dioxide layer |
| 310 | Heater seed metal deposit |
| 311 | N-electrode seed metal deposit |
| 312 | 500 nm silicon dioxide layer |
| 313 | Heater via |
| 314 | P-electrode via |
| 315 | N-electrode via |
| 316 | Anti-reflective coating and protection layer |
| 317 | Photoresist tether |
| 401 | Silicon substrate |
| 402 | Buried oxide layer |
| 403 | Silicon device layer |
| 404 | Etching mask |
| 405 | Taper cavity |
| 406 | Device cavity |
| 407 | Adhesive layer |
| 501 | Stamp |
| 502 | Opening for heater contact |
| 503 | Opening for P-electrode |
| 504 | Opening for N-electrode |

The invention claimed is:

1. An optoelectronic device, comprising:
a silicon-on-insulator platform, including a silicon waveguide located within a silicon device layer of the silicon-on-insulator platform, a substrate, and an insulator layer between the substrate and the silicon device layer;
a III-V semiconductor based device, located within a cavity of the silicon-on-insulator platform and including a III-V semiconductor based waveguide, coupled to the silicon waveguide; and
a bridge, comprising a homogeneous dielectric material, bridging a gap between a facet of the III-V semiconductor based waveguide and a facet of the silicon waveguide,
wherein the III-V semiconductor based device includes a heater and one or more electrical traces, connected to the heater, wherein the heater is embedded within an insulating material of the III-V semiconductor based device, and wherein the one or more electrical traces extend from the III-V semiconductor based device to respective contact pads on the silicon-on-insulator platform, and
wherein the III-V semiconductor based device comprises:
a layer of the homogeneous dielectric material above the heater and above a slab of the III-V semiconductor based waveguide; and
a first insulator layer above the layer of homogeneous dielectric material, the first insulator layer and the layer of homogeneous dielectric material being composed of different materials, and
wherein a first electrode extends through the layer of homogeneous dielectric material and through the first insulator layer to contact the heater, and
wherein a second electrode extends through the layer of homogeneous dielectric material and through the first insulator layer to contact the slab.

2. The optoelectronic device of claim 1, wherein the one or more traces connected to the heater are laterally spaced from one or more traces electrically connected to one or more electro-optically active components in the III-V semiconductor based device.

3. The optoelectronic device of claim 1, wherein the III-V semiconductor based waveguide is curved, and the heater is located adjacent to the III-V semiconductor based waveguide and with a corresponding curve.

4. The optoelectronic device of claim 3, wherein the heater is located on an inside region of the curved III-V semiconductor based waveguide.

5. The optoelectronic device of claim 1, wherein the heater is a doped region of the III-V semiconductor based device.

6. The optoelectronic device of claim 5, wherein the doped region is doped with an n-type species of dopant.

7. The optoelectronic device of claim 1, wherein the heater is a metal region on or adjacent to the III-V semiconductor based device.

8. The optoelectronic device of claim 7, wherein the metal of the metal region is selected from the group consisting of: titanium, titanium nitride, chromium, nickel, and combinations thereof.

9. The optoelectronic device of claim 1, wherein the silicon-on-insulator platform includes a further cavity, located at least partially below the III-V semiconductor based device.

10. The optoelectronic device of claim 1, wherein a portion of the heater closest to an electro-optically active component of the III-V semiconductor base device is at least 3 µm away from the electro-optically active component in the III-V semiconductor based device.

11. The optoelectronic device of claim 1, wherein the heater is entirely spaced apart from the III-V semiconductor based waveguide in a plan view.

12. The optoelectronic device of claim 1, wherein the III-V semiconductor based waveguide comprises a first doped layer of a first material, and the heater comprises a first doped layer of the first material, the first doped layer of the heater being laterally spaced apart from the first doped layer of the III-V semiconductor based waveguide.

13. The optoelectronic device of claim 1, wherein the heater is a metal region that is above a doped slab of the III-V semiconductor based waveguide and laterally spaced apart from a ridge of the III-V semiconductor based waveguide.

14. The optoelectronic device of claim 1, wherein the III-V semiconductor based waveguide comprises a ridge protruding from the slab, the slab comprises a doped first material directly above an insulating semiconductor layer, and the heater comprises the doped first material and is directly above the insulating semiconductor layer.

15. A method of manufacturing an optoelectronic device, comprising the steps of:
providing a silicon-on-insulator platform, the silicon-on-insulator platform including:
a substrate,
a silicon device layer,
an insulator layer between the substrate and the silicon device layer,
a silicon waveguide located within the silicon device layer, and
a cavity;

providing a III-V semiconductor based device coupon, including a III-V semiconductor based waveguide and a heater, the heater being embedded within an insulating material of the III-V semiconductor based device coupon, wherein the III-V semiconductor based device coupon comprises:
  a layer of homogeneous dielectric material above the heater, and
  a first insulator layer above the layer of homogeneous dielectric material, the first insulator layer and the layer of homogeneous dielectric material being composed of different materials;
transfer printing the III-V semiconductor based device coupon into the cavity of the silicon-on-insulator platform;
forming a bridge, comprising the homogeneous dielectric material, bridging a gap between a facet of the Ill-V semiconductor based waveguide and a facet of the silicon waveguide; and
electrically connecting the heater, via one or more traces, to one or more contact pads that are provided in the silicon-on-insulator platform and that extend through the first insulator layer and through the layer of homogeneous dielectric material to contact the heater.

16. The method of claim 15, further including a step, before electrically connecting the heater, of spin coating a dielectric material into one or more channels between the III-V semiconductor based device coupon and one or more sidewalls of the cavity of the silicon-on-insulator platform.

17. The method of claim 16, wherein the method includes a step, after spin coating the dielectric material, of thermally curing the dielectric material.

18. The method of claim 15, further including a step, after transfer printing the III-V semiconductor based device coupon, of depositing a passivation layer over an exposed upper surface of the III-V semiconductor based device coupon.

19. The method of claim 18, further including a step, after depositing the passivation layer, of opening a contact window above the heater, before electrically connecting the heater via the one or more traces to the one or more contact pads.

20. The method of claim 15, wherein the method includes a step, before transfer printing the III-V semiconductor based device coupon, of etching a thermally isolating cavity into a bed of the cavity in the silicon-on-insulator platform.

* * * * *